US009538495B2

(12) United States Patent
Hannan et al.

(10) Patent No.: US 9,538,495 B2
(45) Date of Patent: *Jan. 3, 2017

(54) SYSTEM AND METHOD FOR HYBRID LOCATION IN AN LTE NETWORK

(71) Applicant: CommScope Technologies LLC, Hickory, NC (US)

(72) Inventors: Ariful Hannan, Sterling, VA (US); Tariqul Islam, Germantown, MD (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,188

(22) Filed: Apr. 14, 2014

(65) Prior Publication Data

US 2014/0228049 A1 Aug. 14, 2014

Related U.S. Application Data

(63) Continuation of application No. 13/388,384, filed as application No. PCT/US2009/052876 on Aug. 5, 2009, now Pat. No. 8,787,942.

(51) Int. Cl.
*H04W 24/00* (2009.01)
*H04W 64/00* (2009.01)
(Continued)

(52) U.S. Cl.
CPC ............ *H04W 64/00* (2013.01); *G01S 5/0036* (2013.01); *G01S 5/0221* (2013.01); *G01S 5/0257* (2013.01); *G01S 5/06* (2013.01); *G01S 5/10* (2013.01)

(58) Field of Classification Search
CPC ... H04L 29/08108; H04W 64/00; H04W 4/02; H04W 48/04
(Continued)

(56) References Cited

U.S. PATENT DOCUMENTS 3,150,372 A 9/1964 Groth, Jr.
3,659,085 A 4/1972 Potter et al.
(Continued)

FOREIGN PATENT DOCUMENTS

JP 06-347529 12/1994
WO 99-15911 A1 4/1999
WO 2006088472 A1 8/2006

OTHER PUBLICATIONS

Y. Zhao, "Standardization of Mobile Phone Positioning for 3G Systems," IEEE Communications Magazine, Jul. 2002, pp. 108-116.
(Continued)

*Primary Examiner* — Christopher M Brandt
*Assistant Examiner* — Matthew Genack
(74) *Attorney, Agent, or Firm* — Fogg & Powers LLC

(57) ABSTRACT

A system and method for estimating a location of a wireless device receiving signals from plural nodes of a communications network. A wireless device may be directed to transmit a first signal having one or more predetermined parameters. At one or more location measurement units ("LMU") an uplink time of arrival ("TOA") measurement between the wireless device and one or more of the plural nodes or LMUs may be determined as a function of the first signal transmitted from the wireless device. Downlink signal measurements of signals received by the wireless device may be collected, and a location of the wireless device determined as a function of the uplink TOA measurements and the collected downlink signal measurements.

20 Claims, 16 Drawing Sheets

(51) Int. Cl.
  *G01S 5/00* (2006.01)
  *G01S 5/02* (2010.01)
  *G01S 5/06* (2006.01)
  *G01S 5/10* (2006.01)

(58) Field of Classification Search
  USPC .................................. 455/414.1, 456.1–456.6
  See application file for complete search history.

(56) References Cited

U.S. PATENT DOCUMENTS

| | | |
|---|---|---|
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,110,774 B1 | 9/2006 | Davis et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0097182 A1* | 7/2002 | Goren ................ G01S 1/026 342/357.4 |
| 2002/0172223 A1 | 11/2002 | Stilp et al. |
| 2003/0064734 A1 | 4/2003 | Stilp et al. |

(56) References Cited

U.S. PATENT DOCUMENTS

| | | |
|---|---|---|
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1* | 6/2005 | Kennedy .............. H04W 64/00 455/456.1 |
| 2005/0148346 A1 | 7/2005 | Maloney et al. |
| 2005/0153653 A1 | 7/2005 | Diao et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0128399 A1 | 6/2006 | Duan et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |
| 2009/0131073 A1 | 5/2009 | Carlson et al. |
| 2009/0245148 A1* | 10/2009 | McCoy .............. H04W 72/1231 370/310 |
| 2010/0029295 A1* | 2/2010 | Touboul ............ H04W 56/0015 455/456.1 |
| 2011/0065453 A1* | 3/2011 | Baldemair ............ G01S 5/0009 455/456.1 |
| 2011/0086644 A1* | 4/2011 | Dahlman ............ H04W 72/042 455/450 |
| 2011/0143771 A1* | 6/2011 | Edge ........................ H04W 4/02 455/456.1 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University, Apr. 16-18, 1997, 4pages.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

(56) References Cited

OTHER PUBLICATIONS

W.H. Foy, "Position-Location Solutions by Taylor-Series Estimation", IEEE Transactions Aerospace and Electronic Systems, vol. AES-12, No. 2, Mar. 1976, pp. 187-194.
R.G. Stansfield, "Statistical Theory of DF Fixing", Journal IEE 94, Part III A, Oct. 1947, pp. 762-770.
M.P. Wylie and J. Holtzman, "The Non-Line of Sight Problem in Mobile Location Estimation", Process IEEE 5th International Conference on Universal Personal Communications, vol. 2, Oct. 1996, pp. 827-831.
L.Cong and W. Zhuang, "Non-Line-of-Sight Error Mitigation in TDOA Mobile Location", Process IEEE Global Telecommunications Conference, vol. 1, Sep. 2001, pp. 680-684.
P.C. Chen, "A Non-Line-of-Sight Error Mitigation Algorithm in Location Estimation", Process IEEE Conference on Wireless Communications Networking, vol. 1, 1999, pp. 316-320.
N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.
J. Caffery, Jr., and G. Stuber, "Subscriber Location in CDMA Cellular Networks," IEEE Transactions on Vehicular Technology, vol. 47, No. 2, May 1998, pp. 406-416.
J. Caffery. Jr., "A New Approach to the Geometry of TOA Location," IEEE, VTC 2000, pp. 1943-1949.
M.Silventoinen and T. Rantalainen, "Mobile Station Emergency Locating in GSM", Process IEEE International Conference, Personal Wireless Communications, vol. 1, 1996, pp. 232-238.
International Searching Authority, International Search Report for International Application PCT/US09/52876 mailed Apr. 28, 2010, 1pg.
Rick Roberts, "Project: IEEE P802.15 Working Group for Wireless Personal Area Networks (WPANS)," Harris Corporation, Melbourne, Florida, Oct. 4, 2004, pp. 1-11.
Stephanie Bell, A Beginners Guide to Uncertainty of Measurement, The National Physics Laboratory of the United Kingdom of Great Britain and Northern Ireland, Teddington, Middlesex, UK, 2001, pp. 1-41.
U.S. Patent Office, "Advisory Action", "from U.S. Appl. No. 13/388,384", Mar. 12, 2014, pp. 1-3, Published in: US.
U.S. Patent Office, "Notice of Allowance", "from U.S. Appl. No. 13/388,384", Apr. 15, 2014, pp. 1-5, Published in: US.
U.S. Patent Office, "Office Action", "from U.S. Appl. No. 13/388,384", Jul. 24, 2013, pp. 1-21, Published in: US.
U.S. Patent Office, "Office Action", "from U.S. Appl. No. 13/388,384", Jan. 2, 2014, pp. 1-17, Published in: US.
International Search Authority, "International Preliminary Report on Patentability and Written Opinion for PCT Application No. PCT/US2009/052884", Feb. 7, 2012, pp. 1-4, Published in: WO.

\* cited by examiner

SYSTEM AND METHOD FOR HYBRID LOCATION IN AN LTE NETWORK

RELATED APPLICATIONS

The instant application is a continuation of and co-pending with U.S. patent application Ser. No. 13/388,384, entitled "System and Method for Hybrid Location in an LTE Network", filed 1 Feb. 2012 (the "'384 Application") which is itself a U.S. national stage application of International Patent Application No. PCT/US2009/052876, entitled, "System and Method for Hybrid Location in an LTE Network", the entirety of each of the above referenced applications are hereby incorporated herein by reference. The '384 Application is also related to and co-pending with each of the following applications: International Patent Application No. PCT/US2009/052884, entitled, "System and Method for Hybrid Location in a UMTS Network," filed Aug. 5, 2009; International Patent Application No. PCT/US2009/052879, entitled, "System and Method for Hybrid Location in a CDMA2000 Network," filed Aug. 5, 2009; International Patent Application No. PCT/US2009/053919, entitled, "System and Method for Hybrid Location in a WiMAX Network," filed Aug. 14, 2009; International Patent Application No. PCT/US2009/053909, entitled, "System and Method for Locating a Wireless Device in a WiMAX Network Using Uplink Signals," filed 14 Aug. 2009. The entirety of each of the above referenced applications are hereby incorporated herein by reference.

BACKGROUND

The location of a mobile, wireless or wired device is a useful and sometimes necessary part of many services. The precise methods used to determine location are generally dependent on the type of access network and the information that can be obtained from the device. For example, in wireless networks, a range of technologies may be applied for location determination, the most basic of which uses the location of the radio transmitter as an approximation. The Internet Engineering Task Force ("IETF") and other standards forums have defined various architectures and protocols for acquiring location information for location determination. In one exemplary network, e.g., a Voice over Internet Protocol ("VoIP") network, a location server ("LS") may be automatically discovered and location information retrieved using network specific protocols.

Other exemplary wireless networks are a World Interoperability for Microwave Access ("WiMAX") network and a Long Term Evolution ("LTE") network. Generally, WiMAX is intended to reduce the barriers to widespread broadband access deployment with standards-compliant wireless solutions engineered to deliver ubiquitous fixed and mobile services such as VoIP, messaging, video, streaming media, and other IP traffic. WiMAX enables delivery of last-mile broadband access without the need for direct line of sight. Ease of installation, wide coverage, and flexibility makes WiMAX suitable for a range of deployments over long-distance and regional networks, in addition to rural or underdeveloped areas where wired and other wireless solutions are not easily deployed and line of sight coverage is not possible.

LTE is generally a 4G wireless technology and is considered the next in line in the GSM evolution path after UMTS/HSPDA 3G technologies. LTE builds on the 3GPP family including GSM, GPRS, EDGE, WCDMA, HSPA, etc., and is an all-IP standard like WiMAX. LTE is based on orthogonal frequency division multiplexing ("OFDM") Radio Access technology and multiple input multiple output ("MIMO") antenna technology. LTE provides higher data transmission rates while efficiently utilizing the spectrum thereby supporting a multitude of subscribers than is possible with pre-4G spectral frequencies. LTE is all-IP permitting applications such as real time voice, video, gaming, social networking and location-based services. LTE networks may also co-operate with circuit-switched legacy networks and result in a seamless network environment and signals may be exchanged between traditional networks, the new 4G network and the Internet seamlessly.

The original version of the standard on which WiMAX is based (IEEE 802.16) specified a physical layer operating in the 10 to 66 GHz range. 802.16a, updated in 2004 to 802.16-2004, added specifications for the 2 to 11 GHz range. 802.16-2004 was updated by 802.16e-2005 in 2005 and uses scalable orthogonal frequency division multiple access ("SOFDMA") as opposed to the OFDM version with 256 sub-carriers (of which 200 are used) in 802.16d. More advanced versions, including 802.16e, also bring Multiple Antenna Support through MIMO functionality. This brings potential benefits in terms of coverage, self installation, power consumption, frequency re-use and bandwidth efficiency. Furthermore, 802.16e also adds a capability for full mobility support. Most commercial interest is in the 802.16d and 802.16e standards, since the lower frequencies used in these variants suffer less from inherent signal attenuation and therefore gives improved range and in-building penetration. Already today, a number of networks throughout the world are in commercial operation using WiMAX equipment compliant with the 802.16d standard.

The WiMAX Forum has provided an architecture defining how a WiMAX network connects with other networks, and a variety of other aspects of operating such a network, including address allocation, authentication, etc. It is important to note that a functional architecture may be designed into various hardware configurations rather than fixed configurations. For example, WiMAX architectures according to embodiments of the present subject matter are flexible enough to allow remote/mobile stations of varying scale and functionality and base stations of varying size. There is, however, a need in the art to overcome the limitations of the prior art and provide a novel system and method for locating WiMAX and LTE subscriber stations. While LTE protocol is being defined in the 3GPP standards as the next generation mobile broadband technology, there is also a need for mobile subscriber or user equipment ("UE") location in LTE networks for compliance with the FCC E-911 requirements and for other location based services.

A number of applications currently exist within conventional communication systems, such as those supporting Global System for Mobile Communication ("GSM"), Time Division Multiple Access ("TDMA"), Code Division Multiple Access ("CDMA"), Orthogonal Frequency Division Multiple Access ("OFDMA") and Universal Mobile Telecommunications System ("UMTS") technologies, for which location solutions are needed by mobile units, mobile stations, UE or other devices and by other entities in a wireless network. Examples of such applications may include, but are not limited to, GSM positioning and assisted global position system ("A-GPS") positioning. A-GPS adaptable UE may acquire and measure signals from a number of satellites to obtain an accurate estimate of the UE's current geographic position. GPS-based solutions may offer excellent accuracy, but GPS-based solutions generally suffer from yield issues in indoor environments or in environments that provide a poor line of sight to the open sky in which to best receive GPS satellite transmissions. Furthermore, embedding GPS chipsets into UE may also add an associated cost to the manufacturing of the UE and an associated cost to A-GPS functionality in the respective communications network. Further, some organizations are hesitant to offer a positioning method solely based upon the availability of a satellite network controlled by the United States government.

There, however, exists a need in the art to locate UMTS, OFDMA or W-CDMA mobile devices to satisfy FCC E-911 regulations as well as to provide Location Based Services for mobile phone users. The 3GPP UMTS standard outlines several methods for location including Cell-ID, A-GPS, Observed Time Difference of Arrival ("OTDOA"), and Uplink Time Difference of Arrival ("U-TDOA"). Cell-ID generally is the simplest method which provides coarse positioning of mobile devices based on a known location of the coverage area centroid of each base station sector. Additionally, A-GPS is a straightforward implementation for network and handset manufacturers due to their legacy in CDMA2000 networks. Likewise, U-TDOA is also a straightforward technique for those skilled in the art and has been widely deployed for other air standards. OTDOA, on the other hand, is confronted with significant implementation challenges for network carriers, due to the fact that the base station timing relationships must be known, or measured, for this technique to be viable. For unsynchronized UMTS networks, where the base station timing is not locked to a common timing source, the 3GPP standard offers the suggestion that base station Location Measurement Units ("LMUs") or Network Synchronization Units ("NSUs") may be utilized to recover this timing information. Once the base station timing relationships are measured, the handset measurements of Observed Time Difference ("OTD") between various base stations may be translated into absolute ranges and range differences from which position can be calculated (e.g., through UE-based or UE-assisted methods).

Network carriers, however, appear to have little interest in implementing the OTDOA solution. This may be due to a general lack of cost-effective solutions for practical implementations of OTDOA in unsynchronized UMTS networks, significant hardware, installation, testing, and associated maintenance costs, and/or a lack of available LMU or NSU vendors. Further, the lack of interest by network carriers in implementing the OTDOA solution may also be due to a lack of handset manufacturers implementing OTDOA measurements into the associated firmware, negative perception of OTDOA due to the potential network capacity impacts if Idle Period Downlink ("IPDL") is enabled by carriers, and/or carrier perception that A-GPS handsets will meet all the location needs of its users.

The UMTS standard offers alternative location solutions for UE location. OTDOA technologies, with or without IPDL, have been developed and integrated into the UMTS standard as optional features to enable location of UEs. However, UMTS carriers have been reluctant to adopt these technologies because carriers had not initially requested these optional features in most UE devices. Additionally, concern may exist regarding the impact OTDOA may have on the operation of a communications network including call quality and network capacity. Because widespread adoption of OTDOA may require modifications in both the base stations and mobile stations, network providers are generally more interested in a solution that operates with existing mobile devices and base stations.

In a network-based geolocation system, the mobile appliance to be located is typically identified and radio channel assignments determined by, for example, monitoring the control information transmitted on a radio channel for telephone calls being placed by the mobile appliance to detect calls of interest, e.g., 911 calls, or a location request provided by a non-mobile appliance source, i.e., an enhanced services provider. Once a mobile appliance to be located has been identified and radio channel assignments determined, the location determining system is tasked to determine the geolocation of the mobile appliance, and report the determined position to an appropriate entity, such as a mobile call center or enhanced services provider.

Some prior art systems are mobile appliance-based and determine the position of the mobile appliance by receiving multiple dedicated location signals either from components outside the mobile appliance's communication system, such as satellites and GPS systems or from a network of dedicated land-based antennas. Other prior art geolocation systems that are network overlay, or infrastructure-based, systems use combinations of specific, as opposed to ambiguous, measurements generally from multiple base stations, such as AOA, TOA and TDOA. These specific measurement values may be utilized to solve a set of mathematical equations to determine the location of the mobile appliance.

Some prior art systems may rely on determining a channel assignment by monitoring the control information transmitted on a radio channel for telephone calls being placed by the mobile appliance to thereby detect calls of interest or a location request provided by a non-mobile appliance source, e.g., an enhanced services provider. In either case, the identification of the mobile user and its channel assignment necessitate retrieval of information bits from the mobile appliance, through control signals or call setup information. However with the advent of the third generation CDMA specification known in the art as CDMA2000, a new system and method can be used to determine the location of a mobile appliance independent of the information data bits transmitted by the mobile appliance. In a system operating under the IS-95 standard, the forward link uses the pilot, paging, and sync control channels to maintain the link while the forward traffic channel is used for data and voice communication. On the reverse link, the mobile access channel is used to gain access to the system and the traffic channel is used for data and voice transfer. In a system operating under the CDMA2000 IS-2000 standard, the IS-95 forward link channels are used in addition to a dedicated reverse pilot channel from the mobile appliance to the base station. The reverse pilot signal is unique for each mobile appliance and is typically a function of the Electronic Serial Number ("ESN"). The reverse pilot signal generally identifies the mobile appliance and typically incorporates a time reference so subsequent data sent by the mobile appliance may be decoded at the base station. The reverse pilot channel typically is used, for example, for coherent demodulation, multi-source combining, and identification of a mobile appliance. For IS-95 systems, a network overlay geolocation system for geolocating a mobile appliance typically entails transferring a large amount of information through the geolocation system in order to geolocate a mobile appliance. As is known in the art, the ESN of a mobile appliance may typically be determined from a location requesting entity, from control channels, from certain signaling present in the wired portion of the wireless communication system, or other such methods. Details of the reverse pilot signal in a CDMA2000 wireless communication system are established by the Telecommunications Industry Association ("TIA"), and the existence of the reverse pilot channel in IS-2000 communication systems presents a resource for efficiently geolocating a mobile appliance.

Therefore, there is a need in the art to utilize the characteristics of the reverse pilot channel in creating a system and method for geolocating a mobile appliance operating in a wireless communication system under the CDMA2000 specifications. To obviate the deficiencies in the prior art one embodiment of the present subject matter provides a hybrid mobile location method that uses both uplink and downlink signal measurements in an exemplary communications network, such as, but not limited to, a WiMAX, UMTS, CDMA2000, and/or LTE network.

One embodiment of the present subject matter provides a method for estimating a location of a wireless device receiving signals from plural nodes of a WiMAX communication system. The method may comprise determining downlink signal measurements including a range of the wireless device from a serving node, an OTDOA measurement of a signal from one or more neighboring nodes, and a transmission time of the signal from the one or more neighboring nodes. The method may further include determining uplink signal measurements including a TOA measurement of a ranging signal from the wireless device, and a timing adjust parameter of the wireless device. A location of the wireless device may then be estimated as a function of the determined downlink and uplink signal measurements.

Another embodiment of the present subject matter may provide a method for estimating a location of a wireless device receiving signals from plural nodes of a WiMAX communication system. The method may comprise determining downlink signal measurements of first signals received by the wireless device from the plural nodes, and transmitting a second signal from at least one of the plural nodes to the wireless device. A third signal may be transmitted from the wireless device in response to the second signal, and uplink signal measurements determined as a function of the third signal. A location of the wireless device may then be estimated as a function of the determined downlink and uplink measurements.

A further embodiment of the present subject matter provides a system for estimating a location of a wireless device receiving signals from a plurality of nodes of a communication system. The system may include circuitry for determining downlink signal measurements of first signals received by the wireless device from the plural nodes and a transmitter for transmitting a second signal from at least one of the plural nodes to the wireless device. The system may also include a receiver for receiving a third signal transmitted from the wireless device in response to the second signal and circuitry for determining uplink signal measurements as a function of the third signal. The system may include circuitry for estimating a location of the wireless device as a function of the determined downlink and uplink measurements.

One embodiment of the present subject matter provides a method for estimating a location of a wireless device receiving signals from plural nodes of a communications network. The method comprises directing a wireless device to transmit a first signal having one or more predetermined parameters, transmitting the first signal by the wireless device, and determining at one or more LMUs an uplink TOA measurement between the wireless device and one or more of the plural nodes or LMUs as a function of the transmitted first signal. Downlink signal measurements of signals received by the wireless device may be collected and a location of the wireless device determined as a function of the uplink TOA measurements and the collected downlink signal measurements.

Another embodiment of the present subject matter provides a method for estimating a location of a wireless device receiving signals from plural nodes of a communications network. The method comprises directing a wireless device to transmit a sounding reference signal ("SRS") or demodulation reference signal ("DMRS") with one or more predetermined parameters, and transmitting the SRS or DMRS signal by the wireless device. An uplink TOA measurement between the wireless device and one or more of the plural nodes or LMUs may be determining at the LMUs as a function of the transmitted signal, and a location of the wireless device determined as a function of the uplink TOA measurement.

A further embodiment of the present subject matter provides a method for estimating a location of a wireless device receiving signals from plural nodes of an LTE communications network. The method comprises directing a wireless device to transmit a first signal having one or more predetermined parameters and transmitting the first signal by the wireless device. A range of the wireless device from a node serving the wireless device may be determined as a function of information in the transmitted first signal. This determination may comprise determining a timing adjustment from signals transmitted by said serving node, receiving the transmitted first signal transmitted by the wireless device at a reference station, correlating the received first signal with a reference signal, determining time of arrival information from the correlated signal, and determining a range of the wireless device from one or more of the plural nodes as a function of one or more of the time of arrival and timing adjustment information. A location of the wireless device may then be determined as a function of the determined range.

One embodiment of the present subject matter provides a method for estimating a location of a wireless device receiving signals from plural nodes of a UMTS network. The method comprises collecting OTDOA measurements of signals received by the wireless device, and transmitting a message to a standalone serving mobile location center ("SAS"), the message including round trip time information, tipping information, and the collected OTDOA measurements. One or more LMUs may be tasked to determine uplink and downlink signal measurements between the wireless device and ones of the plural nodes as a function of the transmitted message. Range measurements from the wireless device to ones of the plural nodes, uplink TOA measurements, and downlink TOA measurements may then be determined at one or more LMUs, a location of the wireless device estimated as a function of the uplink and downlink TOA measurements, OTDOA measurements, round trip time information, and range measurements.

An additional embodiment of the present subject matter provides a system for estimating a location of a wireless device. The system may include circuitry for collecting OTDOA measurements of signals received by the wireless device, a transmitter for transmitting a message including round trip time information, tipping information, and the collected OTDOA measurements, and circuitry for tasking one or more LMUs to perform uplink and downlink signal measurements between the wireless device and ones of plural nodes as a function of the transmitted message. The system may also include circuitry at the one or more LMUs for performing range measurements from the wireless device to ones of the plural nodes, uplink TOA measurements, and downlink TOA measurements, and circuitry for estimating a location of the wireless device as a function of the uplink and downlink TOA measurements, OTDOA measurements, round trip time information, and range measurements.

Another embodiment of the present subject matter provides a system and method for estimating a location of a wireless device receiving signals from plural nodes of a Code Division Multiple Access 2000 communications system. One or more ranges of a wireless device from one or more of the plural nodes may be determined as a function of signals received at the wireless device from the respective one or more plural nodes and as a function of information in an uplink pilot signal. From one or more location measurement units ("LMU") measurements an uplink time of arrival ("TOA") measurement from the device may be determined and then an estimation of the location of the wireless device determined as a function of the uplink TOA and determined one or more ranges.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

Figure 1:
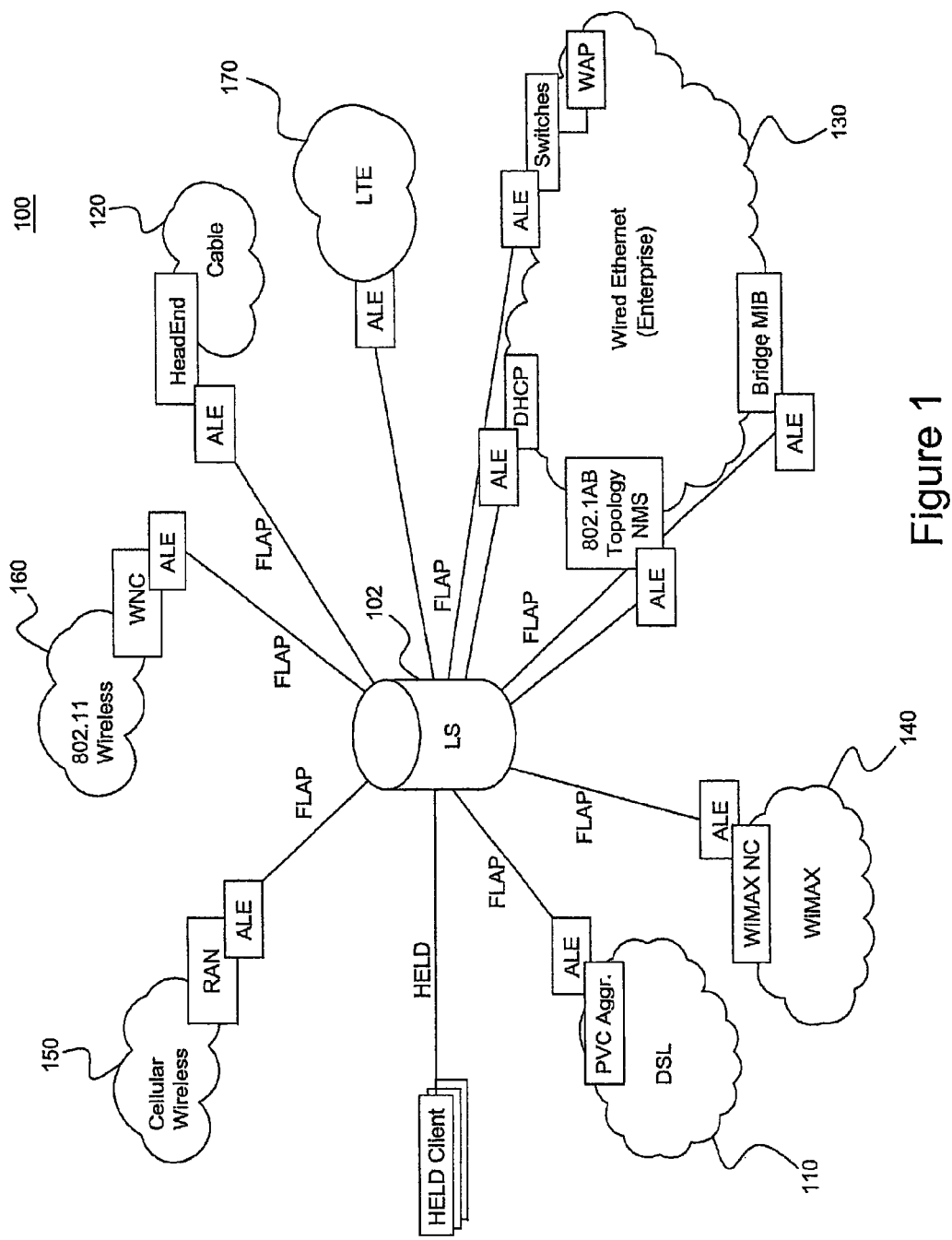
FIG. 1 is a diagram of an exemplary access network model.

With reference to the figures where like elements have been given like numerical designations to facilitate an understanding of the present subject matter, the various embodiments of a system and method for hybrid location in an LTE network are herein described.

Embodiments of the present subject matter may provide handsets capable of OTDOA measurements, network support of OTDOA measurements, GPS trained LMUs deployed in the network, network support of providing uplink tipping information and OTDOA measurements to a serving mobile location center ("SMLC").

Generally, a WiMAX or LTE subscriber or mobile station may provide to a communications network round trip delay ("RTD") information of an anchor base station's downlink and uplink signals and the observed relative delays of the neighboring base stations' downlink and uplink signals. The phrases subscriber station, mobile station, mobile appliance, wireless device, and user equipment ("UE") are used interchangeably throughout this document and such should not limit the scope of the claims appended herewith. Further, the terms station and device are also used interchangeably throughout this document and such should not limit the scope of the claims appended herewith. The respective WiMAX or LTE network may utilize this data for hand-off operations; however, embodiments of present subject matter may determine from this data a range ring from the anchor or serving base station ("BS") or node and location hyperbolas between the reported BSs, if the BS timings are known.

In one embodiment of the present subject matter, an exemplary system may include a location server ("LS"), such as a Location Information Server ("LIS"), which is generally a network server that provides devices with information about their location. Devices that require location information may be able to request their location from the LS. In the architectures developed by the IETF, NENA and other standards forums, the LS may be made available in an IP access network connecting one or more target devices to the Internet. In other modes of operation, the LS may also provide location information to other requesters relating to a target device.

To determine location information for a target device, an exemplary LS may utilize a range of methods. The LS may use knowledge of network topology, private interfaces to networking devices like routers, switches and base stations, and location determination algorithms. Exemplary algorithms may include known algorithms to determine the location of a mobile device as a function of satellite information, satellite assistance data, various downlink or uplink algorithms such as, but not limited to, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, etc., and hybrid combinations thereof.

FIG. 1 is a diagram of an exemplary access network model. With reference to FIG. 1, an exemplary access network model 100 may include one or more LSs 102 connected to one or more access networks, 110-170. An access network refers to a network that provides a connection between a device and the Internet. This may include the physical infrastructure, cabling, radio transmitters, switching and routing nodes and servers. The access network may also cover services required to enable IP communication including servers that provide addressing and configuration information such as DHCP and DNS servers. Examples of different types of access networks include, but are not limited to, DSL 110, cable 120, WiFi, wired Ethernet 130, WiMAX 140, cellular packet services 150, and 802.11 wireless 160, LTE 170, among others. An exemplary LS 102 may be implemented on multiple processing units, any one of which may provide location information for a target device from a first site, a second site and/or additional sites. Therefore, an exemplary LS 102 may provide high availability by having more than one processing unit at a first site and by having multiple processing units at a second site for copying or backup purposes in the event a site or a processing unit fails.

Figure 2:
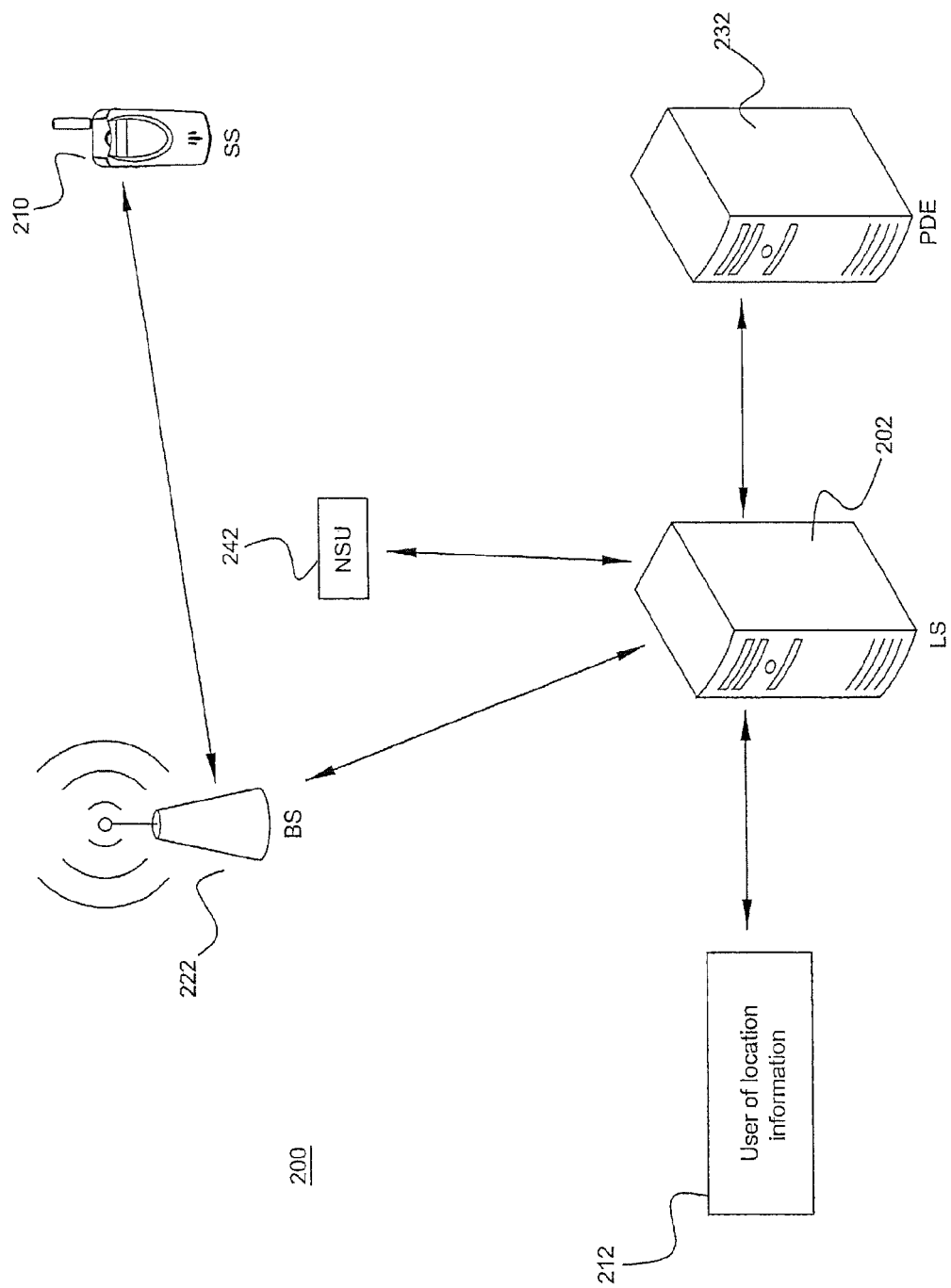
FIG. 2 is a high level diagram of one embodiment of the present subject matter.

FIG. 2 is a high level diagram of one embodiment of the present subject matter. With reference to FIG. 2, an exemplary wireless network or system 200 may include an LS 202 in communication with one or more base stations ("BS") 222, a positioning determining entity ("PDE") 232, one or more network synchronization units ("NSU") 242 and one or more location measurement units (LMUs) (not shown). One or more mobile or subscriber stations or devices 210 may be in communication with the LS 202 via the one or more BSs 222. A recipient or user 212 of location information may request the LS 202 to locate a subscriber station 210. The LS 202 may then request the serving BS 222 to provide network measurement information. The BS 222 receives the data from the target subscriber station 210 and provides the data to the LS 202. The LIS 202 may, in one embodiment, send the data to the PDE 232 to compute the location of the target station or device 210. Once the location is computed, the LS 202 may provide the location information to the requesting user 212.

Figure 3:
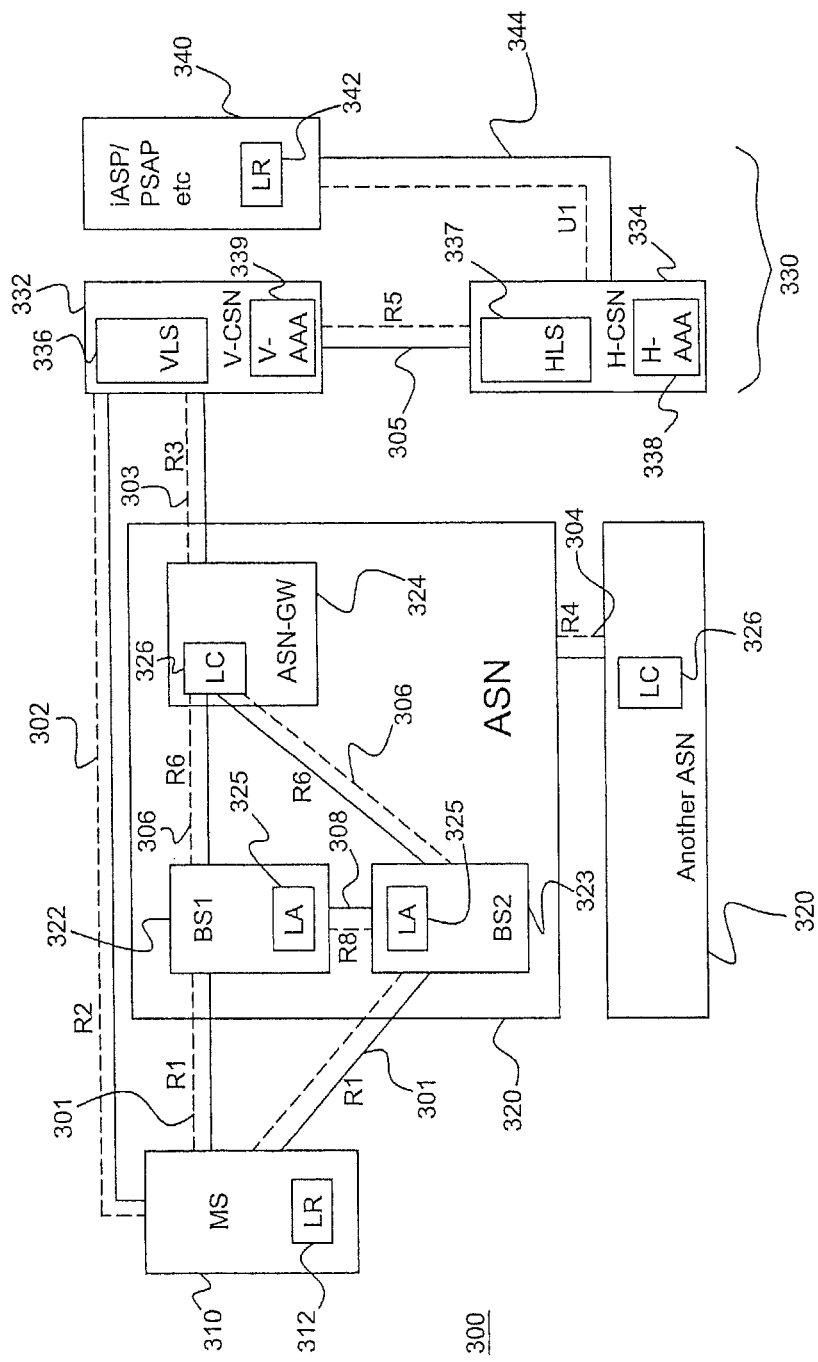
FIG. 3 is a more detailed diagram of an exemplary WiMAX Location Based Service network architecture.

FIG. 3 is a more detailed diagram of an exemplary WiMAX Location Based Service ("LBS") network architecture 300. With reference to FIG. 3, the WiMAX forum defines a number of functional entities and interfaces between those entities. An exemplary network architecture 300 includes one or more access service networks ("ASN") 320, each having one or more base stations ("BS") 322, 323 and one or more ASN gateways ("ASN-GW") 324 forming the radio access network at the edge thereof. One or more mobile stations or devices 310, such as a WiMAX device, having a location requester 312 may be in communication with the ASN 320 via one or more BSs 322, 323 over an R1 interface 301. BSs 322, 323 are responsible for providing the air interface to the device 310. Additional functions may, of course, be part of BSs 322, 323, such as micromobility management functions, handoff triggering, tunnel establishment, radio resource management, QoS policy enforcement, traffic classification, Dynamic Host Control Protocol ("DHCP") proxy, key management, session management, and multicast group management, to name a few. BSs 322, 323 communicate with one another via resident location agents ("LA") 325 over an R8 interface 308. LAs 325 are generally responsible for measurements and reporting and may communicate with the device 310 to collect measurements. BSs 322, 323 also communicate with the ASN-GWs 324 via a location controller ("LC") 326 in the ASN-GW 324 over an R6 interface 306. LCs 326 generally trigger and collect location measurements and forward these measurements to an LS in a selected connectivity service network ("CSN") 330.

The ASN-GW 324 generally acts as a layer 2 traffic aggregation point within an ASN 320. Additional functions that may be part of the ASN-GW 324 include, but are not limited to, intra-ASN location management and paging, radio resource management and admission control, caching of subscriber profiles and encryption keys, AAA client functionality, establishment and management of mobility tunnel with BSs, QoS and policy enforcement, foreign agent functionality for mobile IP and routing to a selected CSN. Communication between ASNs 320 occurs over an R4 interface 304. It should also be noted that a Public Safety Answering Point ("PSAP") or an Internet Application Service Provider ("iASP") 340 may also include a location requester 342 and may be in communication with a home CSN 334 over a U1 interface 344. The U1 interface 344 may also be in communication with a visited CSN ("V-CSN") 332 and hence the visited location server and communication from the applications (PSAPs included) may be to either the visited or the home location servers.

A third portion of the network includes the CSN 330. The CSN may be a visited network having a V-CSN 332 or a home network having a home-CSN ("H-CSN") 334, collectively CSNs 330. These CSNs 330 provide IP connectivity and generally all the IP core network functions in the network 300. For example, the CSN 330 provides connectivity to the Internet, ASP, other public networks and corporate networks. The CSN 330 is owned by a network service provider ("NSP") and includes Authentication Authorization Access ("AAA") servers (home-AAA 338 and visited-AAA 339 servers) that support authentication for the devices, users, and specific services. The CSN 330 also provides per user policy management of QoS and security. The CSN 330 is also responsible for IP address management, support for roaming between different NSPs, location management between ASNs 320, and mobility and roaming between ASNs 320, to name a few. Communication between the ASN 320 and a CSN 330 occurs via the respective ASN-GW 324 over an R3 interface 303.

One entity within a CSN 330 is an LS. Depending upon whether the device 310 is roaming and in direct communication with a remote network or in direct communication with a home network, the LS may be a visited-LS ("V-LS") 336 or a home-LS ("H-LS") 337. The role of the LS is to provide location information about a WiMAX device 310 in the network 300. Communication between the WiMAX device 310 and the LS 336, 337 is performed over an R2 interface 302.

It should be noted that there are several location determination methods supported by the above-described network architecture 300. For example, a location server may utilize 802.16m MAC and PHY features to estimate a location of a mobile appliance when GPS is not available via an R2 interface, e.g., indoors, or be able to faster and more accurately acquire GPS signals for location determination. The network 300 may make the GPS assistance data, including GPS Almanac data and Ephemeris data, available to the device 310 using the R2 interface and HELD or SUPL.

Non-GPS-Based supported methods may rely on the role of the serving and neighboring BSs or other components. For example, in a downlink ("DL") scenario, a device 310 may receive existing signals (e.g., preamble sequence) or new signals designed specifically for the LBS measurements, if it is needed to meet the requirement from the serving/attached BS and multiple neighboring BSs 322, 323.

The BSs 322, 323 are able to coordinate transmission of their sequences using different time slots or different OFDM subcarriers. The device 310 may accurately determine the required measurements, even in the presence of multipath channel and heavy interference environment, and then estimate its location accordingly. In an uplink ("UL") scenario, various approaches may be utilized at the BSs 322, 323 to locate the device. Exemplary measurements are generally supported via existing UL transmissions (e.g., ranging sequence) or new signals designed specifically for the LBS measurements. Exemplary methods may include but are not limited to, TDOA, TOA, RTD, AOA, RSSI, Advanced forward link trilateration ("A-FLT"), Enhanced observed time difference ("EOTD"), Observed time difference of arrival ("OTDOA"), time of arrival ("TOA"), uplink-TOA and uplink-TDOA, Enhanced cell/sector and cell-ID, etc., and hybrid combinations thereof.

For example, in one embodiment of the present subject matter, a BS 322, 323 may transmit a signal, such as a Fast_Ranging_IE signal, to a mobile device or station 310 and the mobile station 310 may transmit another signal, such as a ranging signal, in response thereto. If the characteristics of the ranging signal are known to components of the network, such as an LMU, then the uplink signal TOA may be determined. Therefore, as the serving BS receives the ranging signal, the serving BS may measure the uplink transmission timing adjustment that provides the range of the mobile station 310 from the respective BS. While uplink measurements are being performed, an exemplary downlink OTDOA location method may also be invoked, and therefore, both uplink and downlink measurements may be utilized to determine a location of the mobile station 310.

Figure 4:
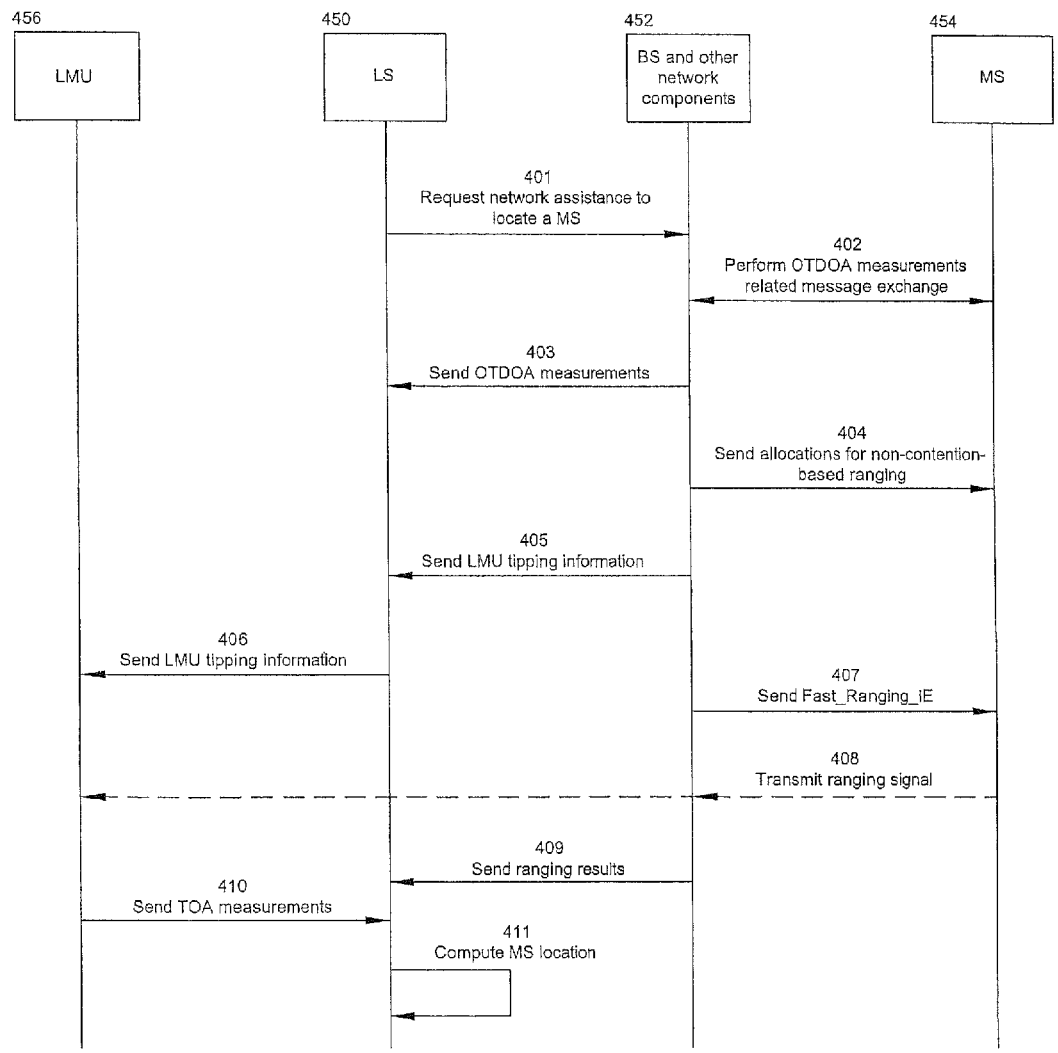
FIG. 4 is a diagram illustrating one method for hybrid signal based location in a WiMAX network.

FIG. 4 is a diagram illustrating one method for hybrid signal based location in a WiMAX network. With reference to FIG. 4, a location server ("LS") 450 may at step 401 transmit a request for network assistance to a BS 452. At step 402, the mobile station 454 may perform OTDOA measurements and send such measurements to the BS 452 or other network components. These OTDOA measurements may then be provided to the LS at step 403. One exemplary downlink OTDOA location technique is described in further detail in co-pending U.S. Application No. 61/055,658 and Ser. No. 12/104,250, the entirety of each are incorporated herein by reference. These OTDOA measurements may be performed independently of any of the identified steps in FIG. 4.

In step 404, the BS 452 may transmit ranging related parameters to a mobile station 454. For example, the BS 452 may transmit allocations for non-contention based ranging to the MS 454. This may be performed utilizing a UL-MAP IE signal and/or UCD. The parameters of a UL-MAP IE signal are described in section 8.4.5.4, table 287 of IEEE Std. 802.16e-2005 and the parameters of UCD are described in section 11.3.1, table 353 of the same, the entirety of each are incorporated herein by reference. In one embodiment, the BS 452 may allocate the ranging opportunity sufficiently ahead of actual transmission time so that LMUs 456 in the respective network may possess adequate time to tune to the uplink signal and collect samples prior to transmission of a ranging signal from the MS 454. If, however, sufficient allocation of a ranging opportunity is not possible, the LMUs 456 may continuously collect and save baseband samples in a circular buffer. Tipping information may be transmitted from the BS 452 to the LS 450 and then to the LMUs 456 in steps 405 and 406. Once tipping information arrives at the LMU 456, the LMUs 456 may search for the TOA of a ranging signal in previously stored data.

LMU tipping information is generally a set of parameters that defines a ranging signal transmitted by an MS 454. An LMU 456 may utilize tipping information to recreate the transmitted signal by the MS 454. Table 1 below provides a non-exhaustive list of exemplary tipping information for uplink measurement based location.

TABLE 1

| Parameter Name | Comment |
| --- | --- |
| CID | UL-MAP IE, section 8.4.5.4, table 287 of IEEE Std. 802.16e-2005. |
| Serving BSID | Identifier for the serving BS |
| OFDMA symbol offset | UL-MAP IE, section 8.4.5.4, table 287 of IEEE Std. 802.16e-2005. |
| Subchannel offset | |
| No. OFDMA symbols | UIUC, section 8.4.5.4.3 of IEEE Std. 802.16e-2005. |
| No. subchannels | |
| Ranging method | |
| Dedicated ranging indicator | |
| CDMA_Allocation_IE | UL-MAP IE, section 8.4.5.4, table 287 of IEEE Std. 802.16e-2005. |
| | UIUC = 12, section 8.4.5.4.3 of IEEE Std. 802.16e-2005. |
| Fast_Ranging_IE | UL-MAP IE, UIUC = 15, Section 8.4.5.4.21 of IEEE Std. 802.16e-2005. |
| Permutation base (UL_PermBase) | Section 11.3.1, Table 353 of IEEE Std. 802.16e-2005. |
| Action time | Section 6.3.2.3.52, Table 109 of IEEE Std. 802.16e-2005. |
| Approximate ranging signal transmission time | This parameter may be derived from other parameters such as, but not limited to, approximate clock of the base station, allocation start time, duration of the allocation, etc. Section 10.3.4.1 and table 342 of IEEE Std. 802.16e-2005. |

The parameters listed above in Table 1 are generally dynamic; however, LMUs 456 may also utilize any one or combination of the following semi-static parameters: the BS identity of the base stations, the location of any one of the BSs, the azimuth of the base station sector antennas, downlink preamble sequence of each BS, system bandwidth, sampling frequency, FFT size, etc. These semi-static parameters may be periodically passed to an LS as system log files.

With continued reference to FIG. 4, at step 407, a BS 452 such as a serving BS may transmit a signal, such as but not limited to a Fast_Ranging_IE signal, to the MS 454 to trigger the transmission of the ranging signal. In response, at step 408 the MS 454 may transmit a ranging signal. The ranging signal may be received by any of the BSs 452, serving or neighboring base stations and/or the LMUs 456. The serving BS 452 may then transmit at step 409 another message or signal, such as a MOB_ASC-REP message, including timing adjust parameters for the BSs 452 that detected the ranging signal. The MOB_ASC-REP message may be transmitted with the ranging results from the serving BS 452. The LMUs 456 may then determine the uplink TOAs of the ranging signal and send the TOA values to the LS at step 410. At step 411, the location of the MS 454 may then be determined utilizing any one or combination of an OTDOA of a neighboring BS's downlink signal, a range of the MS from the serving BS (e.g., from OTDOA measurements), a downlink transmission time of the neighboring BSs as measured by the LMU, the uplink TOA of the ranging signal as measured by the LMU, and/or timing adjust of the MS.

Figure 5:
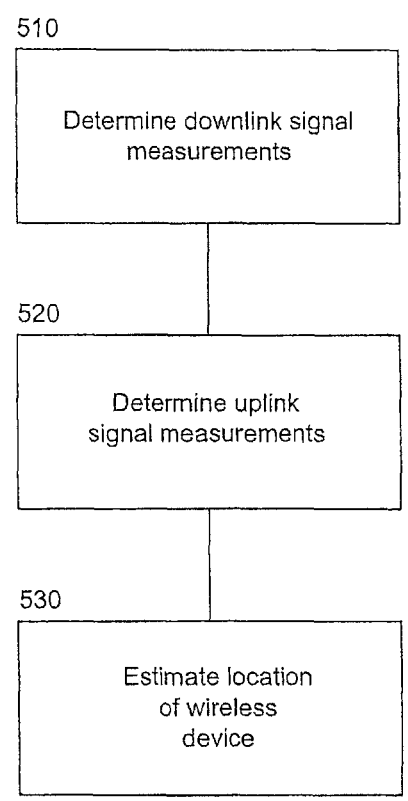
FIG. 5 is a diagram of another embodiment of the present subject matter.

FIG. 5 is a diagram of another embodiment of the present subject matter. With reference to FIG. 5, a method 500 is provided for estimating a location of a wireless device receiving signals from plural nodes of a WiMAX communication system. These nodes may be base stations, base station sectors, and combinations thereof. At step 510, downlink signal measurements may be determined which include a range of the wireless device from a serving node, an OTDOA measurement of a signal from one or more neighboring nodes, and a transmission time of the signal from the one or more neighboring nodes. At step 520, uplink signal measurements may be determined which include a TOA measurement of a ranging signal from the wireless device, and a timing adjust parameter of the wireless device. Of course, the downlink signal measurements may be determined independently of the uplink signal measurements in one embodiment. At step 530, a location of the wireless device may then be estimated as a function of the determined downlink and uplink signal measurements.

Figure 6:
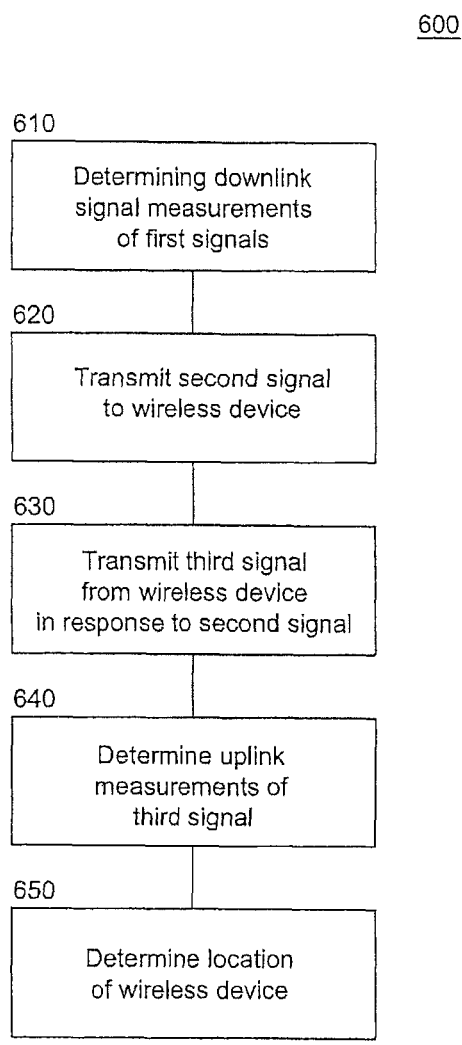
FIG. 6 is a diagram of one embodiment of the present subject matter.

FIG. 6 is a diagram of another embodiment of the present subject matter. With reference to FIG. 6, a method 600 is provided for estimating a location of a wireless device receiving signals from plural nodes of a WiMAX communication system. These nodes may be base stations, base station sectors, and combinations thereof. Exemplary wireless devices may be, but are not limited to, a cellular device, text messaging device, computer, portable computer, vehicle locating device, vehicle security device, communication device, and wireless transceiver. The method may include, at step 610, determining downlink signal measurements of first signals received by the wireless device from the plural nodes, and at step 620 transmitting a second signal from at least one of the plural nodes to the wireless device. Exemplary downlink signal measurements may include one or more of a range of the wireless device from a serving node, an OTDOA measurement of a signal from one or more neighboring nodes, a transmission time of the signal from the one or more neighboring nodes, and combinations thereof. An exemplary second signal may be, but is not limited to, a Fast_Ranging_IE signal. In one embodiment, step 610 may include determining an OTDOA hyperbola using information received from a network measurement report ("NMR").

At step 630, a third signal may be transmitted from the wireless device in response to the second signal, and uplink signal measurements determined as a function of the third signal at step 640. Exemplary uplink signal measurements may include one or more of a TOA measurement of a ranging signal from the wireless device, a timing adjust parameter of the wireless device, and combinations thereof. Further, the downlink signal measurements may be determined independently of the uplink signal measurements in one embodiment. At step 650, a location of the wireless device may be determined as a function of the determined downlink and uplink measurements. In one embodiment, the method 600 may further include the steps of transmitting allocations for non-contention based ranging to the wireless device and transmitting tipping information to one or more LMUs. This transmission of tipping information may include recreating signals transmitted by the wireless device as a function of information selected from the group consisting of: connection identifier ("CID"), base station identifier ("BSID"), azimuth of base station sector antennas, downlink preamble sequence of base stations, system bandwidth, sampling frequency, fast-Fourier transformation size, orthogonal frequency division multiple access ("OFDMA") symbol offset, sub-channel offset, number of OFDMA symbols, number of sub-channels, ranging method, dedicated ranging indicator, CDMA_Allocation_IE parameter, Fast_Ranging_IE parameter, Permutation base, action time, approximate ranging signal transmission time, and combinations thereof. Another embodiment may also include the step of transmitting a request for network assistance to locate the wireless device to at least one of the plural nodes.

Figure 7:
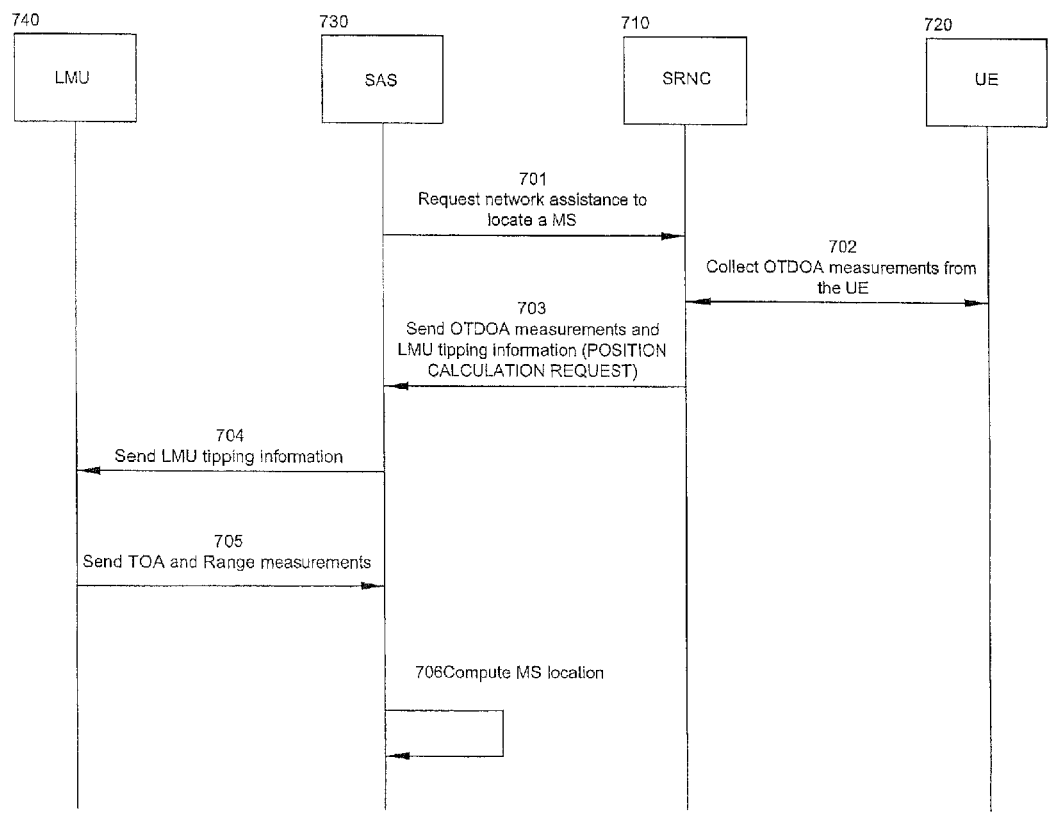
FIG. 7 is a diagram illustrating one method for hybrid signal based location in a Universal Mobile Telecommunications System ("UMTS") network.

FIG. 7 is a diagram illustrating one method for hybrid signal based location in a Universal Mobile Telecommunications System ("UMTS") network. With reference to FIG. 7, a Serving Radio Network Controller ("SRNC") 710 may receive a request for network assistance to locate a wireless device or UE 720 at step 701. This request may be provided by a Stand Alone SMLC ("SAS") 730 or other entity. The SRNC 710 may collect the UE's OTDOA measurements at step 702 and transmit these measurements, for example, as a POSITION CALCULATION REQUEST message, to the SAS at step 703. A POSITION CALCULATION REQUEST message may contain round trip time information, OTDOA measurements, and uplink tipping information. See sections 9.2.2.31, 9.2.2.32, 9.2.2.33, 9.2.2.34 and 9.2.2.74 of 3GPP TS 25.453 V7.6.0 (2007-03) the entirety of which are incorporated herein by reference. After the SAS 730 receives the transmitted message or POSITION CALCULATION REQUEST message, the SAS 730 may task LMUs 740 in the system to make the uplink and downlink measurements at step 704 as a function of tipping information. The LMUs 740 may then provide uplink TOAs, downlink TOAs, and UE range estimates to the SAS 730 at step 705. The SAS or any position determination equipment ("PDE") thereof may then determine the location of the UE 720 using any one or combination of these downlink TOAs, downlink OTDOAs, uplink TOAs, and range estimates at step 706.

Figure 8:
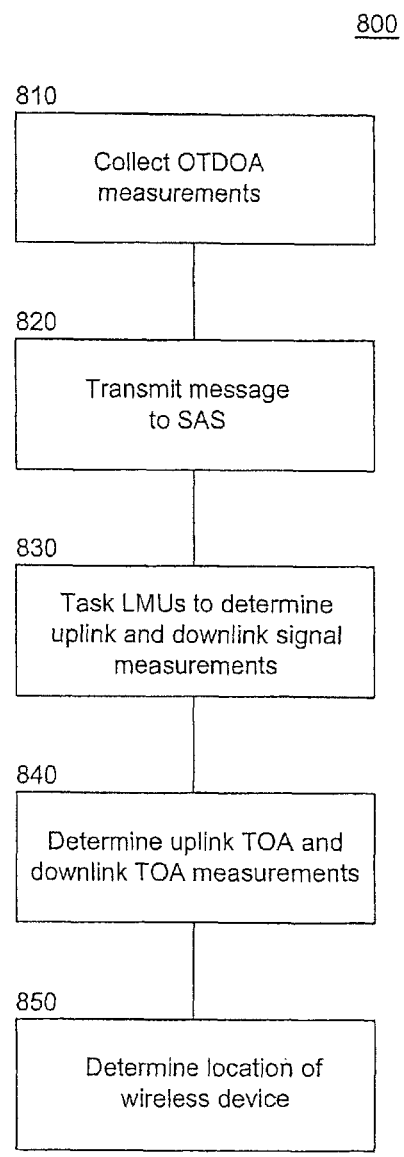
FIG. 8 is a diagram illustrating another method for uplink and downlink signal based location in a network employing UMTS technologies.

FIG. 8 is a diagram illustrating another method for uplink and downlink signal based location in a network employing UMTS technologies. With reference to FIG. 8, at step 810 OTDOA measurements of signals received by a wireless device may be collected and at step 820, a message including round trip time information, tipping information, and the collected OTDOA measurements may be transmitted to a SAS. The wireless device may be, but is not limited to, but are not limited to, a cellular device, text messaging device, computer, portable computer, vehicle locating device, vehicle security device, communication device, and wireless transceiver. In one embodiment, step 810 may further include determining an OTDOA hyperbola using information received from an NMR. In another embodiment, step 810 may include determining ranges from serving and/or neighboring base stations. At step 830 one or more LMUs may be tasked to determine uplink and downlink signal measurements between the wireless device and ones of plural nodes in the network as a function of the transmitted message. These nodes may be, but are not limited to, base stations, base station sectors, radio network controllers, serving radio network controllers, and combinations thereof. At the one or more LMUs, range measurements from the wireless device to ones of the plural nodes, uplink TOA measurements, and downlink TOA measurements may be determined at step 840. In one embodiment of the present subject matter, the range measurements may be determined as a function of a UE Rx-Tx time difference.

A location of the wireless device may then be estimated at step 850 as a function of the uplink and downlink TOA measurements, OTDOA measurements, round trip time information, and range measurements. In one embodiment of the present subject matter, the step of collecting OTDOA measurements and the determination of uplink TOA measurements may be conducted substantially simultaneously. For example, the SRNC may transmit uplink tipping information to the SAS as the SRNC collects downlink OTDOA measurements from the UE. The PDE may then determine a location for the UE when both uplink and downlink measurements are available. Therefore, in one embodiment of the present subject matter, an exemplary GCS may have the following measurements for location computation: relative time difference of arrival of neighboring base stations' downlink signal, range of the UE from the serving BS (from round trip time information), uplink TOA as measured by the LMU, downlink TOA as measured by the LMU, and/or range of the UE from the serving site as measured by the LMU. In another embodiment of the present subject matter, the method may include transmitting a request for network assistance to at least one of the plural nodes to locate the wireless device.

Embodiments of the present subject matter may also be utilized in networks employing LTE technologies. As discussed above, LTE is generally directed toward a packet-optimized IP centric framework and is expected that voice calls will be transported through VoIP and location requests, e.g., E-911, etc., will also be serviced through VoIP. In LTE networks, mobile appliances or devices may be transmitting to an e-NodeB or other access node or femtocell through various physical channels. Uplink timing measurements may be conducted as a function of Sounding Reference Signal ("SRS") or Demodulation Reference Signal ("DMRS") sequences. Generally, the SRS is transmitted by a UE for channel quality assessment and the DMRS is transmitted with and covers the same frequency allocation as the corresponding physical channel. If any one or several LMUs in a respective network is tipped with proper characteristics of these signal sequences, an uplink signal TOA may be determined. Further, the serving node may acquire the timing adjustment of the UE which may thus provide a range of the UE from the e-NodeB. A location of the UE may then be determined as a function of the TOA information from the LMUs and range information from the serving e-NodeB. In another embodiment of the present subject matter, OTDOA measurements may be performed by the UE during LMU uplink TOA measurement performance. Thus, uplink and downlink measurements may then be combined to increase the yield and accuracy of a location determination of the UE.

Figure 9:
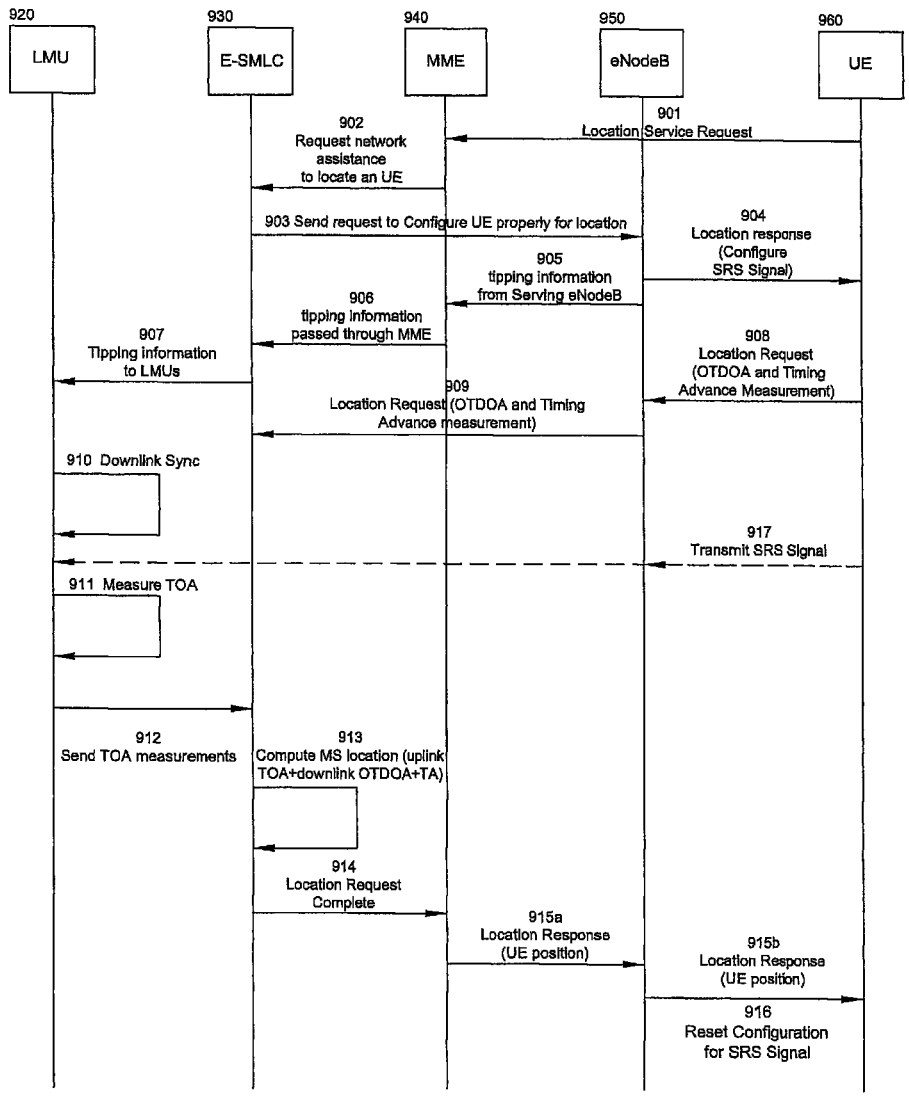
FIG. 9 is a sequence diagram of one embodiment of the present subject matter.

FIG. 9 is a sequence diagram of one embodiment of the present subject matter. With reference to FIG. 9, in response to a location service request, a UE 960 may be directed to generate SRS signals with specific periodicity, power, bandwidth and frequency position. LMUs 920 in the network may be tipped with any or all the characteristic tipping information of the SRS as provided in Table 2 below from an e-SMLC 930 or GCS. The LMU 920 may thus determine uplink TOA information by detecting the SRS signal at the LMU 920. It should be noted that FIG. 9 assumes that there is no direct interface between an e-NodeB 950 and the e-SMLC/SMLC 930. Data may be passed through a Mobility Management Entity ("MME") 940 thereby using the MME 940 as a proxy server. Of course, the MME 940 provides additional functionality as a control-node for an LTE network. Generally, the MME 940 may be responsible for idle mode UE tracking and paging procedure including retransmissions as well as bearer activation/deactivation process among other functions. For example, the MME 940 may verify authorization of the UE 960 to camp on a service provider's Public Land Mobile Network ("PLMN"), may enforce UE roaming restrictions, provide control plane function for mobility between LTE and 2G/3G access networks, etc. Of course, as the SAE network architecture is not finalized yet, variations of the system embodied in FIG. 9 are envisioned and any claims appended herewith should not be so limited.

TABLE 2

| Parameter | Range/Type | Comment |
|---|---|---|
| Uplink E-UTRA Absolute Radio Frequency Channel Number (EARFCN), $N_{UL}$ | 0-65535 | Section 5.7.3 of 3GPP TS 36.101 V8.5.1. Can be derived from $N_{DL}$ |
| Downlink E-UTRA Absolute Radio Frequency Channel Number (EARFCN), $N_{DL}$ | 0-65535 | Section 5.7.3 of 3GPP TS 36.101 V8.5.1. |
| ul-Bandwidth | | Broadcast in System Information Block(SIB) Section 6.3.1. of 3GPP TS 36.331 V8.4.1. |
| Cell Identity | 0-503 | SIB2 section 6.2.2. of 3GPP TS 36.331 V8.4.1. |
| UL-CyclicPrefixLength | Enumerated | RadioResourceConfigCommon message, section 6.3.2 of 3GPP TS 36.331 V8.4.1. |
| srsBandwidth Configuration | 0-7 | SoundingRsUl-Config |
| srsSubframeConfiguration | 0-15 | message, section 6.3.2 of |
| srsBandwidth, b | 0-3 | 3GPP TS 36.331 V8.4.1. |
| frequencyDomainPosition, Parameter: $n_{RRC}$ | 0-23 | |
| srsHoppingBandwidth, Parameter: $b_{hop}$ | 0-3 | |
| duration | Boolean | |
| cyclicShift, Parameter: $n_{SRS}$ | 0-7 | |
| transmissionComb, Parameter: $k_{TC}$ | 0-1 | |
| srs-ConfigurationIndex, Parameter: $I_{SRS}$ | 0-1023 | SoundingRsUl-Config message, section 6.3.2 of 3GPP TS 36.331 V8.4.1. Defined in Section 8.2 of 3GPP TS 36.213 V8.4.0. |

With continued reference to FIG. 9, a location service request may be initiated from the UE 960 at step 901 which may then be provided to the e-SMLC/SMLC 930. In the event that a location service request is initiated from the e-SMLC/SMLC 930 or other entity, a similar procedure may be followed to obtain a location for the UE 960. For example, when a location request service is initiated from an SMLC/e-SMLC 930, the entity may request the serving e-NodeB 950 to send a command to the UE 960 at step 903. The command may be utilized to configure or may directly configure the UE's SRS transmission pattern at step 904. The SRS transmitted (step 917) from the UE 960 may be transmitted at specific or predetermined sub frames and/or with specific or predetermined characteristics as a function of the configuration message or command and may be transmitted until the e-NodeB 950 transmits another command to the UE 960 to cease transmissions or reset transmissions to an original state (step 916).

The e-NodeB 950 may collect the UE's OTDOA and timing advance measurements at step 908 and may transmit these measurements to the e-SMLC/SMLC at step 909. The e-NodeB 950 may also task the LMUs 920 in the system, directly or via the MME 940 and/or e-SMLC/SMLC 930 (steps 905-906) to perform or make uplink and/or downlink measurements at step 907 as a function of tipping information. The LMUs 920 may then measure and/or provide uplink TOA measurements to the e-SMLC/SMLC 930 at steps 911 and 912. The e-SMLC/SMLC 930 or any position determination equipment ("PDE") thereof may then determine the location of the UE 960 using any one or combination of these uplink TOAs, downlink OTDOAs, and timing advances at step 913. The uplink TOA values may be independently used for UE location determination or may be used with the other measurements, e.g., OTDOA of neighboring base stations downlink signals, timing advance of the UE, etc.

The e-SMLC/SMLC 930 may then transmit a signal or message to the MME 940 that the location request is complete and may transmit the UE position to the UE 960 or requesting entity via the MME 940 and/or e-NodeB 950 as appropriate (steps 914-915). In one embodiment, the LMU 920 may acquire downlink frame synchronization and/or sub frame synchronization (step 910) to minimize a search window for SRS sequences transmitted from the UE 960. The LMUs 920 may decode the System Frame Number ("SFN") from the downlink Master Information Block and determine the precise sub frames that the SRS sequences are transmitted from the UE 960 based on srs-ConfigurationIndex $I_{SRS}$ and SRS sub frame offset $T_{Offset}$. These parameters are defined in section 8.2 of 3GPP TS 36.101 V.8.5.1 the entirety of which is incorporated herein by reference.

A minimum selectable bandwidth for SRS transmission may generally be 48 subcarriers (720 kHz) and the periodicity of SRS may be configured to be approximately 2 ms or more. Embodiments of the present subject matter may also provide a capability to control periodicity thus allowing a service provider with greater flexibility to gather several measurements based on the nature of location request. The minimum bandwidth of the SRS should provide correlation lobes for proper timing detection with accuracies within the required boundaries. Enhanced accuracy may also be obtained as a function of higher bandwidths. The setting of the UE Transmit power $P_{SRS}$ for the SRS transmitted on sub frames may be altered by the e-NodeB 950 during a location service request, if necessary, for improved detection at the LMU 920.

The SRS may utilize a frequency-domain reference signal sequence derived as a cyclic extension of prime length Zadoff-Chu sequence. Different phase rotations may be employed to generate different SRS orthogonal to each other. By assigning a different phase shift to a different terminal, multiple SRS can thus be transmitted in parallel in the same sub frame. Hence, several UEs 960 initiating E-911 calls may utilize the same time-frequency resource grid for location purposes. This is yet another advantage provided by embodiments of the present subject matter to wireless service providers in the efficient utilization of radio resources for location services without impacting the capacity of main traffic bandwidth.

As discussed above, uplink measurements may also be made using DMRS sequences. DMRS sequences are generally transmitted for coherent modulation of the Physical Uplink Shared Channel ("PUSCH") which carries traffic data. Using a model or exemplary transmission as a VoIP call, one VoIP packet may be transmitted with one or more Resource Blocks ("RB") within one transmission timer interval ("TTI"). In LTE, a 1 ms TTI generally provides two 0.5 ms slots. The DMRS may be transmitted on each slot over the 1 ms sub frame. Typically for active users, a VoIP packet may be received from speech CODEC every 20 ms; thus, a new VoIP transmission may occur at every 20 TTIs. During inactive periods, a Silence Insertion Descriptor ("SID") packet may arrive every 160 ms. Uplink TOA measurement, during an E-911 call or other location based service request, may require configuration of a VoIP transmission such that signals may be properly acquired at an LMU. According to the LTE specifications, the bandwidth of the DMRS signal is generally equal to the bandwidth allocated for the PUSCH. A typical VoIP call having 12.2 kbps AMR CODEC may require at least 2-3 RB (360 KHz-540 KHz) to transmit speech packets. Hence, the span of the DMRS in the frequency domain may be approximately 360 KHz to 540 KHz. This amount of resource allocation, however, may be insufficient to obtain high accuracy uplink timing from the DMRS. Embodiments of the present subject matter may employ a DMRS bandwidth of approximately 1 MHz, more or less, and may occupy 72 subcarriers and/or 6 RBs in the frequency domain for greater accuracy. In areas having a constrained bandwidth or having limited power, a DMRS with a bandwidth smaller than 1 MHz may be utilized for location measurements but with less accurate results.

When an E-911 call originates, embodiments of the present subject matter may allocate a UE with a persistent time-frequency resource so that the UE may transmit DMRS having a predetermined bandwidth and/or TTI for the duration of the respective location measurement process. For persistent scheduling, the characteristics for the DMRS, defined in section 5.5.2.1 of 3GPP TS 36.212 V8.4.0 the entirety of which is incorporated herein by reference, may be made constant over the duration of the measurement as well. Persistent scheduling may be simpler to implement for E-911 calls and may also require less signaling overhead between network entities.

Figure 10:
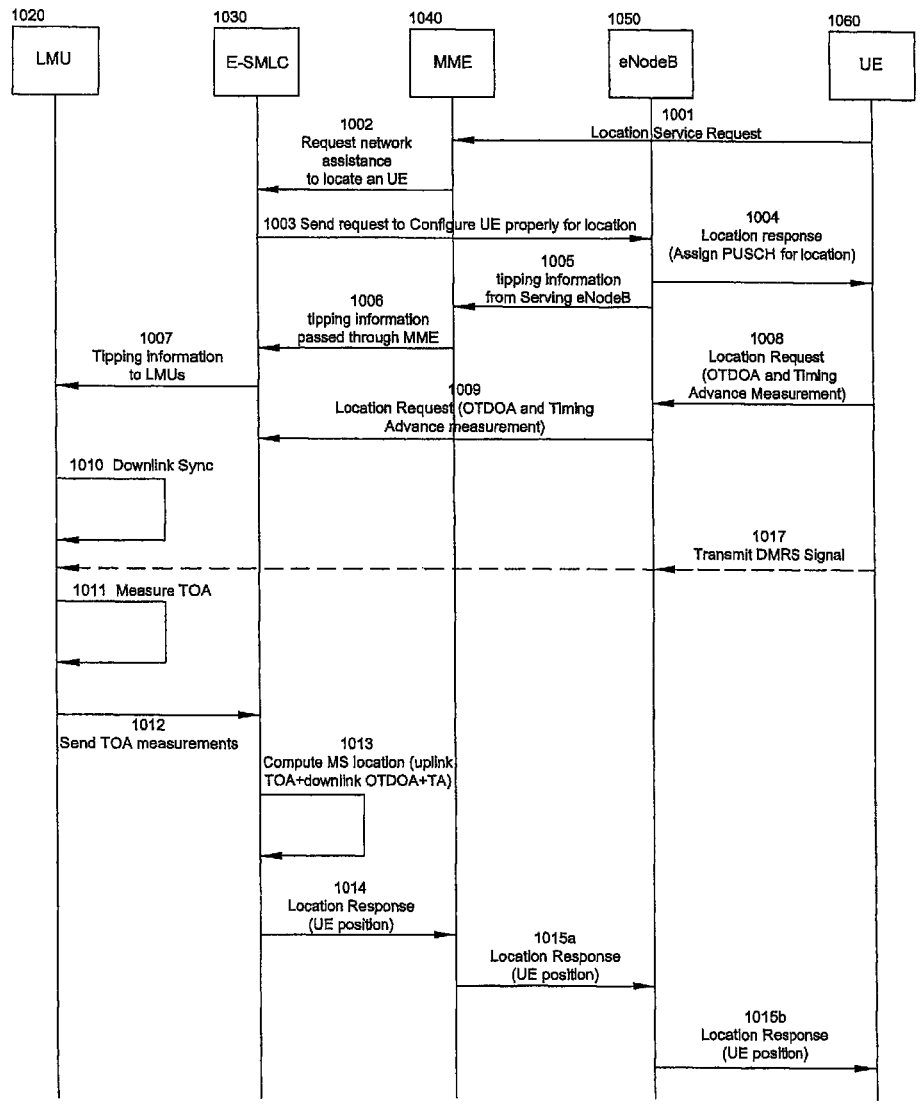
FIG. 10 is a sequence diagram of another embodiment of the present subject matter.

FIG. 10 is a sequence diagram of another embodiment of the present subject matter. With reference to FIG. 10, when a location service request is made (step 1001), an e-NodeB 1050 may adopt any one or combination of the following for uplink scheduling grant assignment: allocation of approximately 6 or more RB when an E-911 or location request is made; schedule the RB under persistent allocation, a scheduling provision within the LTE protocol; grant uplink resource under persistent scheduling for a predetermined number of sub-frames required to determine location measurements of the target UE. While FIG. 10 provides a general illustration of the call flow for a location service request initiated from the UE 1060 which may then be provided to the e-SMLC/SMLC 1030 via an MME 1040, a location service request may be initiated from the e-SMLC/SMLC 1030 or other entity and a similar procedure may be followed to obtain a location for the UE 1060.

Upon receipt or initiation of a location request service, the SMLC/e-SMLC 1030 or other entity may request the serving e-NodeB 1050 to send a command or request to the UE 1060 at step 1003. This request or command may be utilized to configure or may directly configure the UE's DMRS transmission pattern at step 1004 and/or may assign a PUSCH for location purposes. The DMRS transmitted (step 1017) from the UE 1060 may be transmitted with specific or predetermined characteristics discussed above.

The e-NodeB 1050 may collect the UE's OTDOA and timing advance ("TA") measurements at step 1008 and may transmit these measurements to the e-SMLC/SMLC 1030 at step 1009. The e-NodeB 1050 may also task the LMUs 1020 in the system, directly or via the MME 1040 and/or e-SMLC/SMLC 1030 (steps 1005-1006) to perform or make uplink and/or downlink measurements at step 1007 as a function of tipping information. The LMUs 1020 may be tipped with any one or combination of the characteristic information provided in Table 3 below from the e-SMLC/SMLC 1030 or GCS. The LMUs 1020 may then measure and/or provide uplink TOA measurements to the e-SMLC/SMLC 930 at steps 1011 and 1012. The e-SMLC/SMLC 1030 or any position determination equipment ("PDE") thereof may then determine the location of the UE 1060 using any one or combination of these uplink TOAs, downlink OTDOAs, and timing advances at step 1013. The uplink TOA values may be independently used for UE location determination or may be used with the other measurements, e.g., OTDOA of neighboring base stations downlink signals, TA of the UE, etc.

The e-SMLC/SMLC 1030 may then transmit a signal or message to the MME 1040 that the location request is complete and may transmit the UE position to the UE 1060 or requesting entity via the MME 1040 and/or e-NodeB 1050 as appropriate (steps 1014-1015). The LMU 1020 may thus determine uplink TOA information by detecting the DMRS signal at the LMU 1020. It should be noted, however, that FIG. 10 assumes that there is no direct interface between an e-NodeB 1050 and the e-SMLC/SMLC 1030. Data may be passed through an MME 1040 thereby using the MME 1040 as a proxy server. Of course, the MME 1040 provides additional functionality for an LTE network as previously mentioned. As the SAE network architecture is not finalized yet, variations of the system embodied in FIG. 10 are envisioned and any claims appended herewith should not be so limited.

TABLE 3

| Parameter | Range/Type | Bits |
|---|---|---|
| Uplink E-UTRA Absolute Radio Frequency Channel Number (EARFCN), $N_{UL}$ | 0-65535 | Section 5.7.3 of 3GPP TS 36.101 V8.5.1. Can be derived from $N_{DL}$ |
| Downlink E-UTRA Absolute Radio Frequency Channel Number (EARFCN), $N_{DL}$ | 0-65535 | Section 5.7.3 of 3GPP TS 36.101 V8.5.1. |
| ul-Bandwidth | — | Broadcast in System Information Block(SIB) Section 6.3.1. of 3GPP TS 36.331 V8.4.1. |
| Cell Identity | 0-503 | SIB2 section 6.2.2. of 3GPP TS 36.331 V8.4.1. |
| UL-CyclicPrefixLength | Enumerated | RadioResourceConfigCommon message, section 6.3.2 of 3GPP TS 36.331 V8.4.1. |
| groupHoppingEnabled groupAssignmentPUSCH sequenceHoppingEnabled CyclicShift | Boolean 0-29 Boolean 0-7 | UL-ReferenceSignalsPUSCH message, section 6.3.2 of 3GPP TS 36.331 V8.4.1. |
| Cyclic shift for DM RS | 0-7 | Cycle shift in DCI format 0 passed to UE at uplink grant, section 5.3.3.1.1 of 3GPP TS 36.212 V8.4.0. |
| Resource Block Assignment | Combination Structure | DCI format 0 passed to UE at uplink grant, section 5.3.3.1.1 of 3GPP TS 36.212 V8.4.0. |

In one embodiment, the LMU 1020 may acquire downlink frame synchronization and/or sub frame synchronization (step 1010) to minimize a search window for DMRS sequences transmitted from the UE 1060. The LMUs 1020 may decode the SFN from the downlink Master Information Block and estimate a search window for the DMRS as a function of the uplink grant of the radio resource assigned to the UE 1060.

Thus, embodiments of the present subject matter may utilize time-domain correlation and/or frequency domain correlation of the Zadoff-Chu Reference Sequence (used in SRS and DMRS) at the LMU for detection of the SRS or DMRS to obtain uplink TOA measurements. A time domain pilot replica of the appropriate reference sequence may be generated at the LMU to correlate with the received time domain signal. Once coarse timing is obtained, the respective signals may be provided to an FFT channelizer block for fine timing acquisition. Both coherent and non coherent integration may be applied in both time and frequency domains to improve detection in sites having a low signal to noise ratio.

Figure 11:
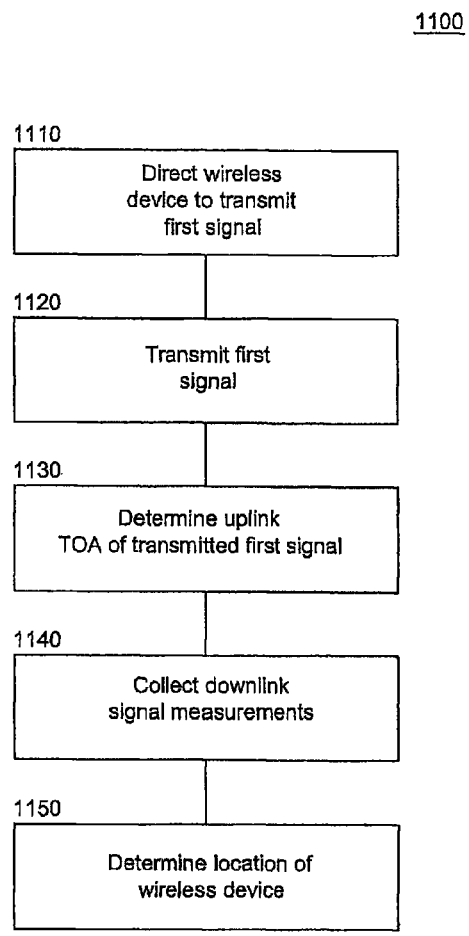
FIG. 11 is a diagram of another embodiment of the present subject matter.

FIG. 11 is a diagram of another embodiment of the present subject matter. With reference to FIG. 11, a method 1100 is provided for estimating a location of a wireless device receiving signals from plural nodes of a communications network, such as an LTE network. The plural nodes may or may not be synchronized as a function of information received from a satellite signal or from a component of the communications network.

The method 1100 may include directing a wireless device to transmit a first signal having one or more predetermined parameters at step 1110, and transmitting the first signal by the wireless device at step 1120. The first signal may be an SRS or DMRS, and the predetermined parameters may be periodicity, frequency bandwidth, power bandwidth, phase rotation, phase, shift, TTI, and combinations thereof. Another embodiment may include the step of acquiring downlink frame or sub-frame synchronization to estimate a search window for the first signal. In a further embodiment, step 1110 may further comprise transmitting a request to one or more of the plural nodes to configure the transmission pattern of the wireless device, and transmitting a second signal from one or more of the plural nodes to the wireless device in response to the transmitted request.

At step 1130, an uplink TOA measurement may be determined at one or more LMUs, the measurement being between the wireless device and one or more of the plural nodes or LMUs as a function of the transmitted first signal. Any of the LMUs may or may not be co-located with a node. Downlink signal measurements of signals received by the wireless device may also be collected at step 1140, and a location of the wireless device determined as a function of the uplink TOA measurements and the collected downlink signal measurements at step 1150. Collected downlink signal measurements may be, but are not limited to, a range of the wireless device from a serving node, an OTDOA measurement of a signal from one or more of the plural nodes, a transmission time of a signal from one or more of the plural nodes, a timing advance, a timing adjustment, and combinations thereof. Additional steps may include receiving a location service request for a wireless device and transmitting a request to an SMLC for network assistance to locate the wireless device.

Figure 12:
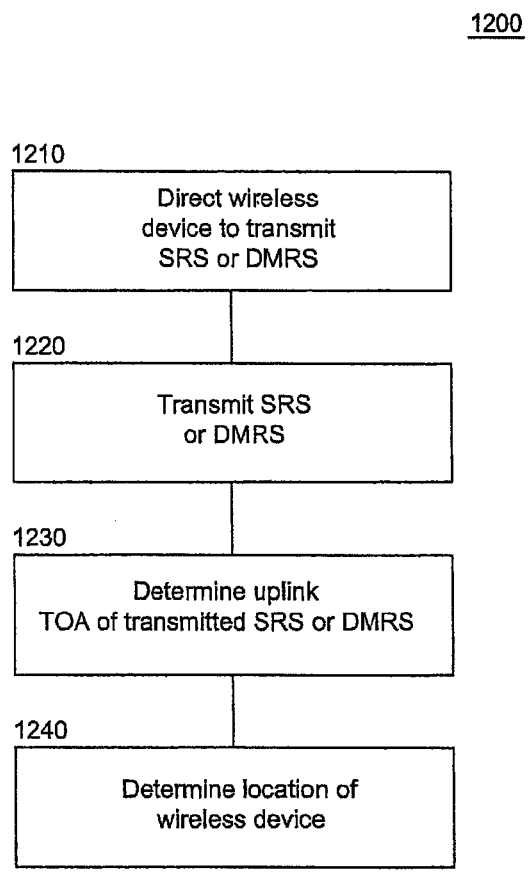
FIG. 12 is a diagram of a further embodiment of the present subject matter.

FIG. 12 is a diagram of a further embodiment of the present subject matter. With reference to FIG. 12, a method 1200 is provided for estimating a location of a wireless device receiving signals from plural nodes of a communications network, such as an LTE network. The plural nodes may or may not be synchronized as a function of information received from a satellite signal or from a component of the communications network. The method 1200 may include directing a wireless device to transmit an SRS or DMRS with one or more predetermined parameters at step 1210, and transmitting the SRS or DMRS by the wireless device at step 1220. The predetermined parameters may be periodicity, frequency bandwidth, power bandwidth, phase rotation, phase, shift, TTI, and combinations thereof. Another embodiment may include the step of acquiring downlink frame or sub-frame synchronization to estimate a search window for the SRS or DMRS. In a further embodiment, step 1210 may further comprise transmitting a request to one or more of the plural nodes to configure the transmission pattern of the wireless device, and transmitting another signal from one or more of the plural nodes to the wireless device in response to the transmitted request.

At step 1230, an uplink TOA measurement may be determined at one or more LMUs, the measurement being between the wireless device and one or more of the plural nodes or LMUs as a function of the transmitted SRS or DMRS. Any of the LMUs may or may not be co-located with a node. A location of the wireless device may then be determined as a function of the uplink TOA measurements at step 1240. Additional steps may include receiving a location service request for a wireless device and transmitting a request to an SMLC for network assistance to locate the wireless device.

Figure 13:
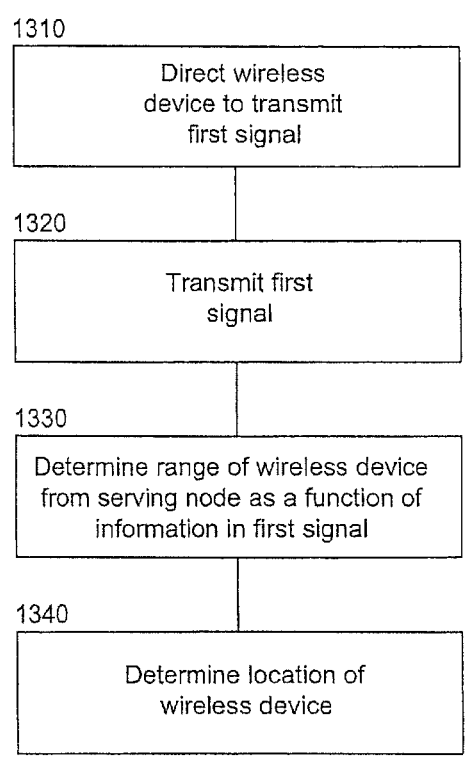
FIG. 13 is a diagram of one embodiment of the present subject matter.

FIG. 13 is a diagram of one embodiment of the present subject matter. With reference to FIG. 13, a method 1300 is provided for estimating a location of a wireless device receiving signals from plural nodes of an LTE communications network. The plural nodes may or may not be synchronized as a function of information received from a satellite signal or from a component of the communications network. The method 1300 may comprise at step 1310 directing a wireless device to transmit a first signal having one or more predetermined parameters and at step 1320, transmitting the first signal by the wireless device. The first signal may be an uplink pilot signal, SRS or DMRS, and the predetermined parameters may be periodicity, frequency bandwidth, power bandwidth, phase rotation, phase, shift, TTI, and combinations thereof. Step 1310 may further comprise transmitting a request to one or more of the plural nodes to configure the transmission patter of the wireless device and transmitting a second signal from one or more of the plural nodes to the wireless device in response to the transmitted request.

At step 1330, a range of the wireless device from a node serving the wireless device may be determined as a function of information in the transmitted first signal by determining a timing adjustment from signals transmitted by the serving node, receiving the transmitted first signal transmitted by the wireless device at a reference station, correlating the received first signal with a reference signal, determining time of arrival information from the correlated signal, and determining a range of the wireless device from one or more of the plural nodes as a function of one or more of the time of arrival and timing adjustment information. Any of the reference stations may or may not be co-located with a node. At step 1340, a location of the wireless device as a function of the determined range. Additional steps may include receiving a location service request for a wireless device and transmitting a request to an SMLC for network assistance to locate the wireless device.

In a system employing a CDMA2000 communications network, a location solution may be similar to that of the UMTS solution described above. In such a network, the CDMA base stations may be synchronized using signals from satellites or from a component in the network. The mobile appliance may then utilize the serving cell's signal as its own timing reference (see section 1.3 of TIA/EIA IS-2000.2-A-1 the entirety of which is incorporated herein by reference). Since the uplink scrambling code is generally a function of a mobile appliance's ESN, any detected uplink signal may provide an opportunity to determine an estimation of the signal propagation time from the serving site to the mobile appliance and back to the LMU or base station. This information may then be converted into range rings and hyperbolas.

In one embodiment of the present subject matter, a mobile appliance may perform the necessary OTDOA measurements and report the measurements to one or more base stations in an exemplary CDMA network, such as a CDMA2000 network. The measurement report message is commonly known as the Provide Pilot Phase Measurement (see section 3.2.4.2 of 3GPP2 C.S0020-0 v3.0 the entirety of which is incorporated herein by reference). OTDOA measurements reported by the mobile appliance may provide, for example, mobile appliance system time offset (MOB_SYS_T_OFFSET), measured pilot phase (PILOT_PN_PHASE), and other useful parameters. The range, however, is unknown to the mobile appliance at this stage. Once the one or more base stations receive the OTDOA measurements from the mobile appliance, an estimate of the mobile appliance's range therefrom (e.g., a serving base station) may be determined utilizing UL TOA information and/or MOB_SYS_T_OFFSET information, etc., if available. If the neighboring base station's timing, which can be expressed in PN offset, is known, the mobile appliance's ranges from the neighboring base stations may also be estimated at this point.

Although only MOB_SYS_T_OFFSET and PILOT_PN_PHASE parameters of the Provide Pilot Phase Measurement message have been identified, such examples should not limit the scope of the claims appended herewith as any number or combination of the following parameters of the same Provide Pilot Phase Measurement message may also be utilized for location computation: time of validity of the reported parameters (TIME_REF_MS), reference PN sequence offset (REF_PN), reference pilot signal strength (REF_PILOT_STRENGTH), number of pilots in measurement (NUM_PILOTS_P), pilot signal strength (PILOT_STRENGTH), and RMS error in PN phase measurement (RMS_ERR_PHASE).

Generally, the OTDOA technique in CDMA2000 is known as Advanced Forward Link Trilateration ("AFLT"); however, there is an inherent problem with the AFLT scheme: the forward link transmit time synchronization generally is not accurate enough for good location estimation. According to sections 4.3.1.1 and 4.3.1.1.3 of 3GPP2 C.S0010-0, the downlink pilot time alignment error can be as high as 10 µs, which equates to around±3 km error in range estimation. Although most base station equipment synchronizes the downlink pilot timing within 3 µs, the ±900 m range error still poses a problem in location estimation. If, however, LMUs are deployed that measure timing within 25 ns (±7.5 m) (one per base station or sparsely deployed) in the system, the information in the Provide Pilot Phase Measurement message may be utilized to derive accurate range rings. Therefore, the LMUs may make uplink TOA measurements for a UL measurement based location solution and may also collect downlink samples and perform downlink pilot measurements.

In one embodiment of the present subject matter, the reference base station may estimate the range to the mobile appliance accurately if the parameter MOB_SYS_T_OFFSET is included in the measurement report. According to section 6.1.5 of ANSI/TIA/EIA-95-B, the entirety of which is incorporated herein by reference, this offset may be up to ±1 µs (±300 m) in steady state and may be up to 512 chips (±125 km), in non-steady state. If MOB_SYS_T_OFFSET parameter is unavailable, this offset will introduce error in range estimation. This error in range estimation, however, may be reduced or tracked out using the triangulation techniques described in co-pending application Ser. No. 12/292,821 the entirety of which is incorporated herein by reference.

Figure 14:
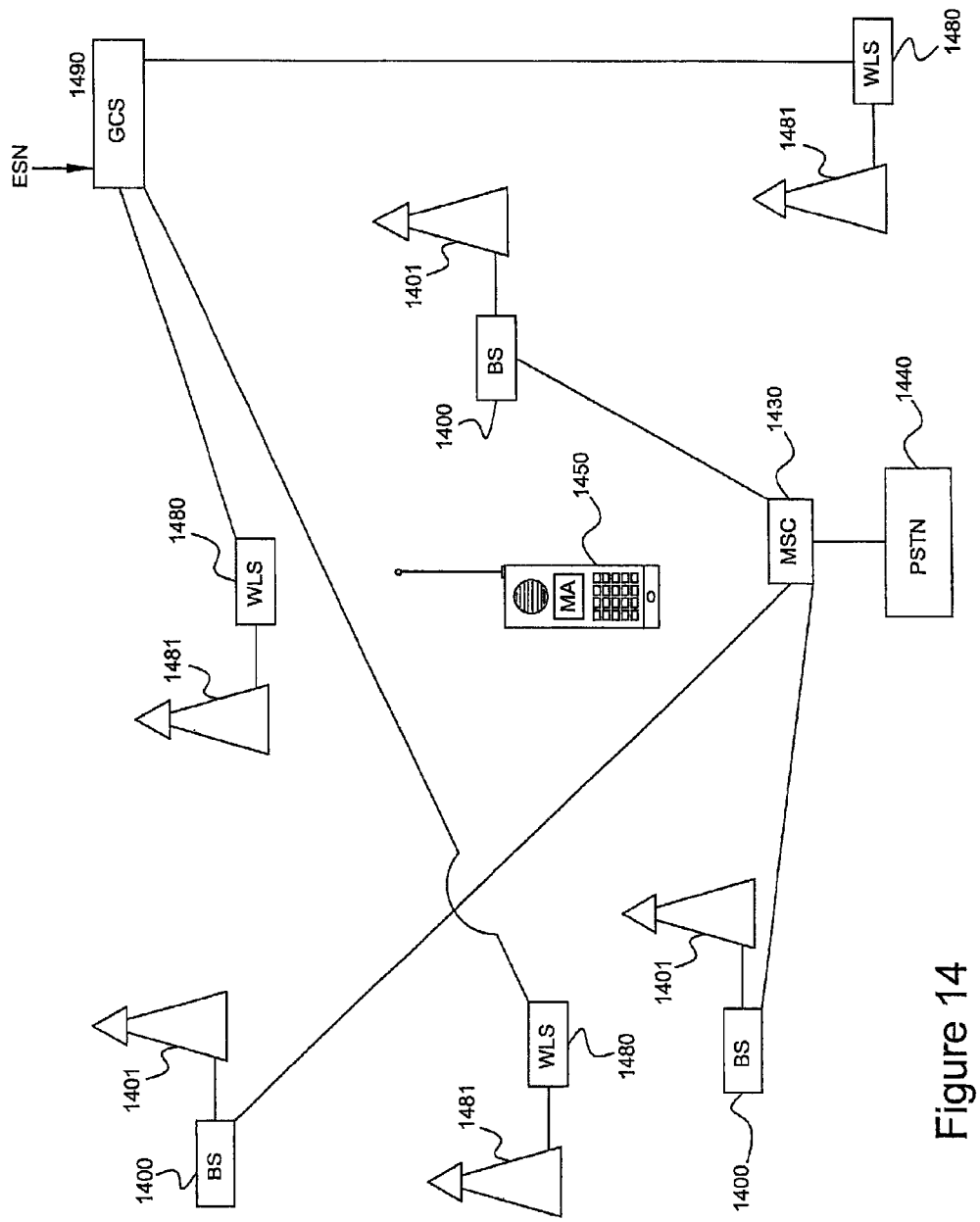
FIG. 14 is an illustration of one embodiment of the present subject matter.

FIG. 14 is an illustration of one embodiment of the present subject matter. With reference to FIG. 14, an exemplary CDMA wireless communication system is shown having three base stations 1400 and associated antennas 1401. Each base station 1400 may be connected to a mobile switching center 1430 which in turn is connected to a PSTN 1440. One embodiment may include a network overlay having plural wireless location sensors 1480 or LMUs with associated antennas 1481 connected to a geolocation processor (or GCS) 1490. The network may collect OTDOA measurements from a mobile appliance 1450 and send them to the GCS 1490 (or SMLC). The LMUs may or may not be involved with this activity. The LMUs may also perform UL and DL measurements and send them to the GCS/SMLC 1490. In this embodiment, the GCS/SMLC 1490 may combine the results, apply LMU measured DL synchronization correction (if necessary), convert the measurements into range rings, and compute a location of the mobile appliance 1450. In another embodiment, the LMU at the serving site may estimate another range using UL and DL measurements without using MOB_SYS_T_OFFSET, as described in co-pending application Ser. No. 11/984,207, the entirety of which is incorporated herein by reference. The network overlay may be independent of the infrastructure or the wireless communication system. Apriori known information such as the ESN for mobile appliances of interest are generally known by the system. Integration into the base station infrastructure is however not precluded for other practical purposes.

The wireless location sensors or LMUs may be at different locations as shown in FIG. 14 or co-located with the base stations utilizing common towers or other shared components. In one embodiment of the present subject matter, a location of a mobile appliance may be determined using a reverse pilot channel. The particulars of an exemplary method are contained in commonly assigned U.S. Pat. No. 7,429,914, the entirety of which is incorporated herein by reference. For example, a target mobile appliance may transmit a reverse pilot signal over a reverse pilot channel. This reverse pilot signal may be in accordance with IS2000 or may be any other type of coded signal which represents a unique signature that can be discerned independent of traffic signals (e.g., signals in which voice information is transferred). The reverse pilot signal may then be received at one or more sensors and correlated with a reference signal (typically at a GCS). The reference signal may be generated as described in U.S. Pat. No. 7,429,914 or other method known to one of skill in the art. The correlation provides a series of correlation values which, if above a threshold, indicates detection of the target mobile appliance's reverse pilot signal. For example, detection of the reverse pilot signal may be accomplished by complex correlating the received signal with an internally generated reference signal of the pilot signal that has been complex scrambled by the target mobile appliance's unique long code sequence. The location of the peak of the correlation may indicate a TOA of the signal at each sensor or receiver site. As is known in the art, complex correlation, correlation and cross-correlation all generally refer to processes in the time domain. One approach to detection is to process the reverse pilot signal using an ambiguity function which jointly operates in the time and frequency domains. This approach may allow detection and TOA estimation in the presence of a frequency difference between the reverse pilot signal and the reference which can occur due to Doppler effects and differences in local frequency references. In the event that the sensors or LMUs are synchronized within the respective system, TDOAs may also be determined as appropriate. Therefore, an embodiment of the present subject matter may determine an estimate of the location of the target mobile appliance as a function of any one or combination of range rings from the base stations determined from downlink OTDOA measurements, a range of the mobile appliance from the serving BS from uplink measurements, uplink TOA from the LMU measurements, and hyperbolas and range rings for neighboring base stations from LMU measurements.

Figure 15:
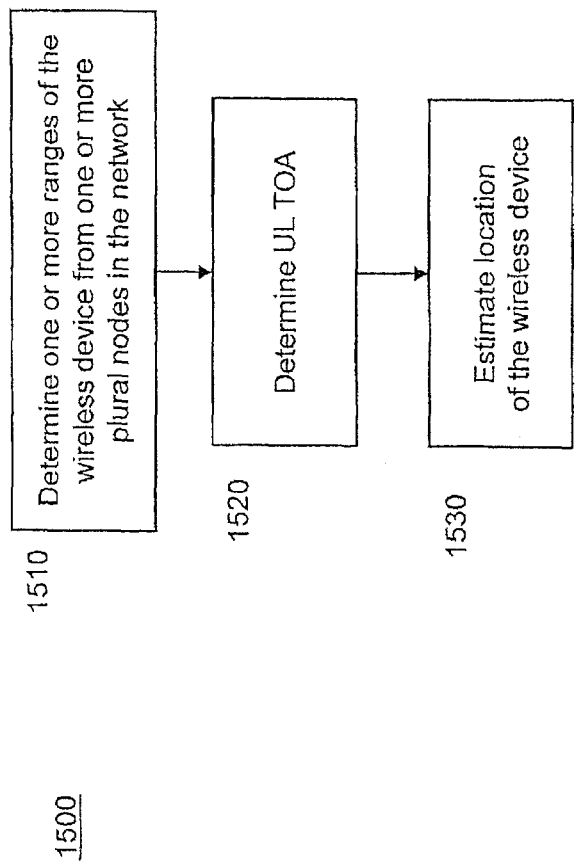
FIG. 15 is a diagram of another embodiment of the present subject matter.

FIG. 15 is a diagram of another embodiment of the present subject matter. With reference to FIG. 15, a method 1500 is illustrated for estimating a location of a wireless device receiving signals from plural nodes of a Code Division Multiple Access 2000 communications system. The plural nodes may be synchronized as a function of information received from a satellite signal or may be synchronized as a function of information received from a component of the system, such as, but not limited to an NSU adaptable to apply a downlink synchronization correction in a respective system. At step 1510, the method may include determining one or more ranges of a wireless device from one or more of the plural nodes as a function of signals received at the wireless device from the respective one or more plural nodes and as a function of information in an uplink pilot signal. In one embodiment, step 1510 may further include determining one or more ranges of a wireless device from one or more of the plural nodes as a function of any one or combination of the following parameters mobile appliance system time offset (MOB_SYS_T_OFFSET), measured pilot phase (PILOT_PN_PHASE), time of validity of the reported parameters (TIME_REF_MS), reference PN sequence offset (REF_PN), reference pilot signal strength (REF_PILOT_STRENGTH), number of pilots in measurement (NUM_PILOTS_P), pilot signal strength (PILOT_STRENGTH), RMS error in PN phase measurement (RMS_ERR_PHASE). In another embodiment, step 1510 may also include receiving downlink signals from the one or more plural nodes at the wireless device, reporting time and distance measurements to the system as a function of the received downlink signals, and generating one or more range rings as a function of the reported time and distance measurements and information in an uplink pilot signal.

Step 1510, in yet another embodiment, may include receiving an uplink pilot signal transmitted by the wireless device, correlating the received uplink pilot signal with a reference signal, determining time of arrival information from the correlated signal, and determining the range of the wireless device from the serving node as a function of the time of arrival information. A further embodiment of the present subject matter may incorporate the steps of receiving an uplink pilot signal transmitted by the wireless device, correlating the received uplink pilot signal with a reference signal, determining time of arrival information from the correlated signal, performing a measurement of information in a downlink pilot signal, and determining the range of the wireless device from the serving node as a function of the time of arrival information and the downlink pilot measurement information in step 1510. Yet another embodiment of step 1510 may include the additional step of compensating the determined range as a function of any one or combination of the following parameters: mobile appliance system time offset (MOB_SYS_T_OFF_SET), measured pilot phase (PILOT_PN_PHASE), time of validity of the reported parameters (TIME_REF_MS), reference PN sequence offset (REF_PN), reference pilot signal strength (REF_PILOT_STRENGTH), number of pilots in measurement (NUM_PILOTS_P), pilot signal strength (PILOT_STRENGTH), RMS error in PN phase measurement (RMS_ERR_PHASE), and combinations thereof.

At step 1520, from one or more LMU measurements an uplink time of arrival ("TOA") measurement from the device may be determined. These LMUs may or may not be co-located with a node. At step 1530, a location of the wireless device may then be estimated as a function of the uplink TOA and the determined one or more ranges. In one embodiment, step 1520 may also include detecting a signal from the wireless device, determining signal propagation time information from the serving node and the wireless device and back to the serving node or an LMU, and determining range or time difference of arrival measurements as a function of the determined information. In a further embodiment of the present subject matter, step 1520 may include the additional step of compensating the determined range or TDOA measurements as a function of any one or combination of the following parameters: mobile appliance system time offset (MOB_SYS_T_OFFSET), measured pilot phase (PILOT_PN_PHASE), time of validity of the reported parameters (TIME_REF_MS), reference PN sequence offset (REF_PN), reference pilot signal strength (REF_PILOT_STRENGTH), number of pilots in measurement (NUM_PILOTS_P), pilot signal strength (PILOT_STRENGTH), RMS error in PN phase measurement (RMS_ERR_PHASE), and combinations thereof.

Figure 16:
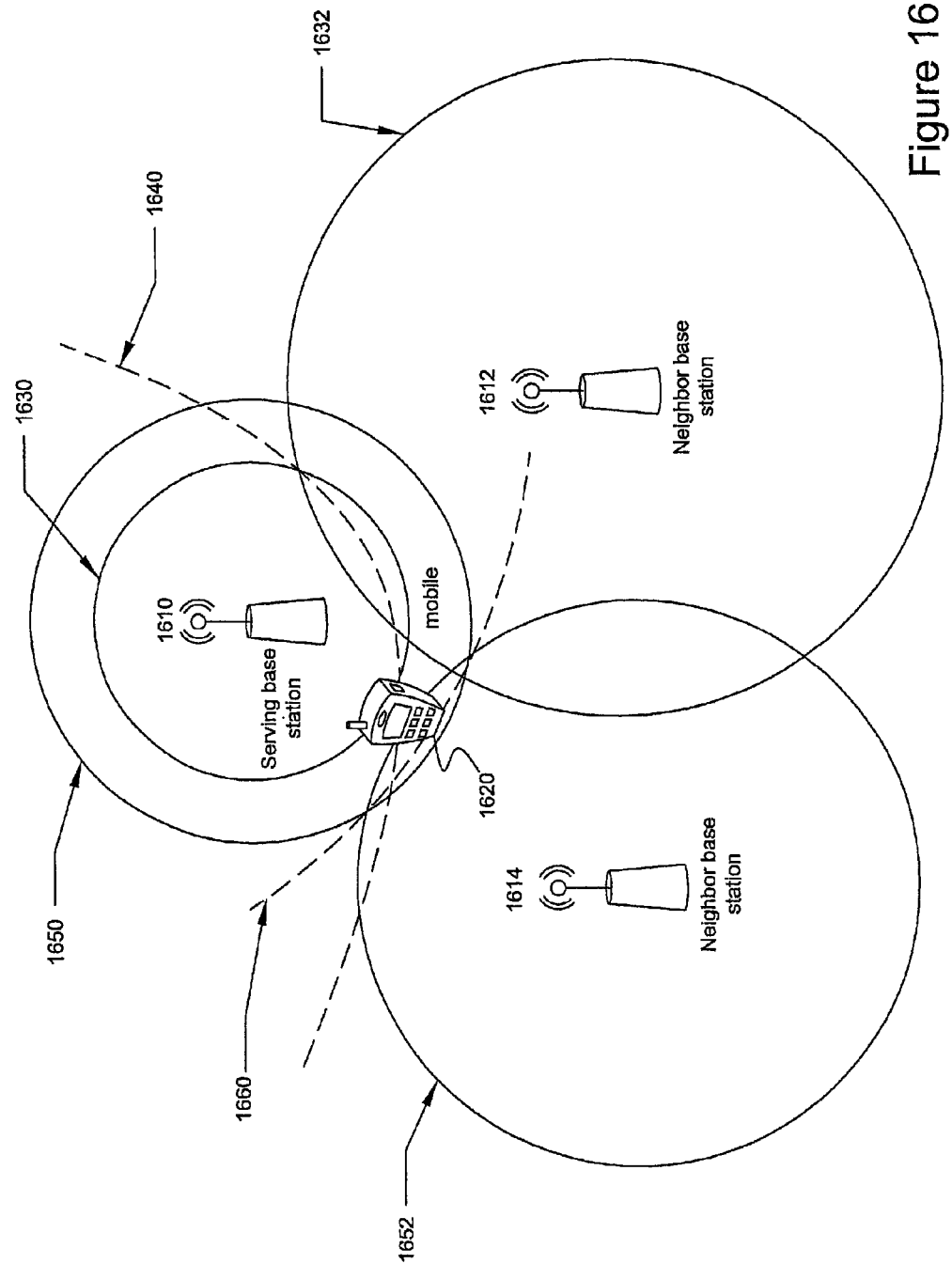
FIG. 16 is an illustration of an exemplary hybrid location technique according to one embodiment of the present subject matter.

FIG. 16 is an illustration of an exemplary hybrid location technique according to one embodiment of the present subject matter. With reference to FIG. 16, an exemplary communications system may include three BSs 1610, 1612, 1614. BS 1610 is the base station serving a mobile appliance 1620 and BSs 1612, 1614 are the neighboring base stations. In this example, at time $t_1$, the mobile appliance 1620 may hear signals transmitted from BSs 1610, 1612 and perform downlink OTDOA measurements on these signals. Two range rings 1630, 1632 and a hyperbola 1640 may be derived from these OTDOA measurements. Any two of these three curves or surfaces are independent and may be utilized for location determination of the mobile appliance 1620. Similarly, at time $t_2$, which may or may not be different than $t_1$, any LMUs (co-located or otherwise) (not shown) may have made uplink TOA measurements from signals transmitted by the mobile appliance 1620. In this non-limiting example, it may be assumed that the range information or the timing adjustment or advance may be available at or around time $t_2$. The downlink channel condition at time $t_1$ and uplink channel condition at time $t_2$ may be different due to mobile movement, different operating frequency, and environmental variations. In this non-limiting example, it may also assumed that the LMUs at BSs 1610, 1614 can detect the uplink signal and make TOA measurements. Two range rings 1650, 1652 and a hyperbola 1660 may then be derived from these LMU measurements. Any two of these three curves are independent and may then be utilized for location determination of the mobile appliance 1620. An exemplary method according to embodiments of the present subject matter may utilize any combination of the four range rings and two hyperbolas to determine the mobile appliance's location. Thus, if the OTDOA measurements include a range of the mobile appliance 1620 from the serving site 1610, range rings for all the neighboring sites 1612, 1614 may be computed. Similarly, if the mobile appliance's transmit time, range from the serving site 1610, or the timing advance (TA) parameter is known, uplink TOA measurements made by the LMUs may also provide the range rings. Moreover, any TDOA measurement, uplink or downlink, may generally provide a hyperbola; and thus, any combination of range rings and hyperbolas may be utilized to determine the location of the mobile appliance 1620 in embodiments of the present subject matter.

It should be noted that the LMU measurements and the downlink OTDOA measurements do not have to be performed simultaneously. For example, if the mobile appliance is static or stationary, measurements made at different times may be as useful for hybrid location technique as the measurements made at the same time.

In the event that a target mobile appliance does not support an OTDOA feature or if the OTDOA measurements are unavailable, the mobile appliance may be located using the LMU measurements alone. Sector geometry is often helpful if the number of participating sites is less than three. In the event that LMUs are not installed in the network or the LMU measurements are unavailable, the mobile appliance may be located using the OTDOA measurements alone. If both the OTDOA and LMU measurements are available, an exemplary hybrid location method according to an embodiment of the present subject matter may be exploited to improve the yield and accuracy of the determined location of the mobile appliance; therefore, in the above example, a hybrid approach may provide three independent range rings which can unambiguously determine the location of the MS.

As shown by the various configurations and embodiments illustrated in FIGS. 1-16, a system and method for hybrid location in an LTE network have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating a location of a wireless device receiving signals from plural nodes of a communications network, the method comprising:
    (a) directing a wireless device to transmit a first signal having one or more predetermined parameters;
    (b) transmitting the first signal by the wireless device;
    (c) determining at one or more location measurement units ("LMU") an uplink time of arrival ("TOA") measurement between the wireless device and one or more of the plural nodes or LMUs as a function of the transmitted first;
    (d) collecting downlink signal measurements of signals received by the wireless device; and
    (e) determining a location of the wireless device as a function of the uplink TOA measurements and the collected downlink signal measurements, wherein determining the location of the wireless device comprises:
        using the uplink TOA measurements and a timing advance measurement to derive a plurality of uplink range rings to the wireless device, each range ring associated with a different node in the plural nodes and at least one uplink hyperbola based on the time difference between the uplink TOA measurements at the different plural nodes;
        using the collected downlink signal measurements to derive a plurality of downlink range rings to the wireless device from the plural nodes and at least one downlink hyperbola based on the time difference between the signal measurements for signals received from the different plural nodes; and
        determining the location of the wireless device based on a combination of range rings and hyperbolas in the plurality of uplink range rings, the plurality of downlink range rings, the at least one uplink hyperbola, and the at least one downlink hyperbola.

2. The method of claim 1 further comprising the step of correlating the transmitted first signal with a reference signal, wherein the determined uplink TOA measurement is determined from the correlated signal.

3. The method of claim 1 wherein the first signal is a sounding reference signal ("SRS") or demodulation reference signal ("DMRS").

4. The method of claim 1 wherein the predetermined parameters are selected from the group consisting of: periodicity, frequency bandwidth, power, phase rotation, phase, shift, transmission time interval ("TTI"), and combinations thereof.

5. The method of claim 1 wherein the step of directing further comprises:
  (i) Transmitting a request to one or more of the plural nodes to configure the transmission pattern of the wireless device; and
  (ii) transmitting a second signal form one or more of the plural nodes to the wireless device in response to the transmitted request.

6. The method of claim 1 further comprising the step of:
  (i) acquiring downlink frame or sub-frame synchronization to estimate a search window for the first signal.

7. The method of claim 1 further comprising the steps of:
  (i) receiving a location service request for a wireless device; and
  (ii) transmitting a request to an evolved serving mobile location center ("E-SMLC") for network assistance to locate the wireless device.

8. The method of claim 1 wherein the collected downlink signal measurements are selected from the group consisting of: a range of the wireless device from a serving node, an observed time difference of arrival ("OTDOA") measurement of a signal from one or more of the plural nodes, a transmission time of a signal from one or more of the plural nodes, a timing advance, a timing adjustment, and combinations thereof.

9. The method of claim 1 wherein at least one of the LMUs is not co-located with a node.

10. The method of claim 1 wherein the plural nodes are synchronized as a function of information received from a satellite signal or from a component of the communications network.

11. The method of claim 1 wherein the communications network is a long term evolution ("LTE") communications network.

12. A method for estimating a location of a wireless device receiving signals from plural nodes of a communications network, the method comprising:
  (a) directing a wireless device to transmit a sounding reference signal ("SRS") or demodulation reference signal ("DMRS") with one or more predetermined parameters;
  (b) transmitting the SRS or DMRS signal by the wireless device;
  (c) determining at one or more location measurement units ("LMU") an uplink time of arrival ("TOA") measurement between the wireless device and one or more of the plural nodes or LMUs as a function of the transmitted signal; and
  (f) determining a location of the wireless device as a function of the uplink TOA measurement, wherein determining the location of the wireless device comprises:
    using the uplink TOA measurements and a timing advance measurement to derive a plurality of range rings to the wireless device, each range ring in the plurality of range rings associated with a different node in the plural nodes and at least one hyperbola based on the time difference between the uplink TOA measurements at the different plural nodes; and
    determining the location of the wireless device based on a combination of range rings and hyperbolas in the plurality of range rings and the at least one hyperbola.

13. The method of claim 12 further comprising the step of correlating the transmitted SRS or DMRS signal with a reference signal, wherein the determined uplink TOA measurement is determined from the correlated signal.

14. The method of claim 12 wherein the predetermined parameters are selected from the group consisting of: periodicity, frequency bandwidth, power, phase rotation, phase, shift, transmission time interval ("TTI"), and combinations thereof.

15. The method of claim 12 wherein the step of directing further comprises:
  (i) transmitting a request to one or more of the plural nodes to configure the transmission pattern of the wireless device; and
  (ii) transmitting another signal from one or more of the plural nodes to the wireless device in response to the transmitted request.

16. The method of claim 12 further comprising the step of:
  (i) acquiring downlink frame or sub-frame synchronization to estimate a search window for the SRS or DMRS.

17. The method of claim 12 further comprising the steps of:
  (i) receiving a location service request for a wireless device; and
  (ii) transmitting a request to an evolved serving mobile location center ("E-SMLC") for network assistance to locate the wireless device.

18. The method of claim 12 wherein at least one of the LMUs is not co-located with anode.

19. The method of claim 12 wherein the plural nodes are synchronized as a function of information received from a satellite signal or received from a component of the communications network.

20. The method of claim 12 wherein the communications network is a long term evolution ("LTE") communications network.

* * * * *